(12) United States Patent
Deguchi

(10) Patent No.: US 8,724,457 B2
(45) Date of Patent: May 13, 2014

(54) COMMUNICATION APPARATUS AND METHOD OF DETERMINING ROUTE

(75) Inventor: Masaki Deguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 92 days.

(21) Appl. No.: 13/401,041

(22) Filed: Feb. 21, 2012

(65) Prior Publication Data

US 2012/0257538 A1 Oct. 11, 2012

(30) Foreign Application Priority Data

Apr. 8, 2011 (JP) ................. 2011-086788

(51) Int. Cl.
*H04L 1/00* (2006.01)
*H04L 12/26* (2006.01)
*H04L 12/56* (2006.01)
*H04L 29/06* (2006.01)

(52) U.S. Cl.
CPC ............. *H04L 45/021* (2013.01); *H04L 45/04* (2013.01); *H04L 45/64* (2013.01); *H04L 45/00* (2013.01); *H04L 29/06* (2013.01)
USPC ........ 370/229; 370/230; 370/230.1; 370/231; 370/232

(58) Field of Classification Search
CPC ....... H04L 45/021; H04L 45/04; H04L 45/02; H04L 45/64; H04L 35/00
USPC .............. 370/229, 230, 230.1, 235, 232, 231, 370/237, 351, 352, 389, 392, 395.31; 709/230, 231, 232, 233, 234, 235, 236, 709/237, 238, 240, 241, 242, 243
See application file for complete search history.

(56) References Cited

U.S. PATENT DOCUMENTS

| 7,680,029 | B2 | 3/2010 | Kano et al. |
| 7,706,284 | B2 | 4/2010 | Suemura |
| 7,787,364 | B2 | 8/2010 | Maeda et al. |
| 2008/0056294 | A1* | 3/2008 | Maeda et al. ................. 370/437 |
| 2008/0075008 | A1 | 3/2008 | Kano |

FOREIGN PATENT DOCUMENTS

| JP | 2008-60755 | 3/2008 |
| JP | 2008-85642 | 4/2008 |
| WO | WO-2004/102903 | 11/2004 |
| WO | WO-2005/101759 | 10/2005 |

* cited by examiner

*Primary Examiner* — Kwang B Yao
*Assistant Examiner* — Adam Duda
(74) *Attorney, Agent, or Firm* — Fujitsu Patent Center

(57) ABSTRACT

A communication apparatus stores topology information that is shared by communication apparatuses included in a network and representing connection states between the communication apparatuses. The topology information includes port identification information for identifying ports that are connectable to each other within each communication apparatus. The communication apparatus determines a route by sequentially selecting a port that can be connected to a port, to which transmission data is input based on the port identification information.

5 Claims, 24 Drawing Sheets

| LSA Header |
| --- |
| Link TLV |
| Sub-TLV=1 |
| Sub-TLV=2 |
| Sub-TLV=5 |
| Sub-TLV=6 |
| Sub-TLV=7 |
| Sub-TLV=8 |
| Sub-TLV=9 |
| Sub-TLV=11 |
| Sub-TLV=14 |
| Sub-TLV=15 |
| Sub-TLV=16 |
| Sub-TLV= (Rest Info) |

FIG.6

| Sub-TLV Type | NAME | OVERVIEW |
|---|---|---|
| 1 | Link Type | TYPE OF LINK |
| 2 | Link ID | LINK ID |
| 3 | Local Interface IP Address | LOCAL IP ADDRESS |
| 4 | Remote Interface IP Address | ADJACENT IP ADDRESS |
| 5 | Traffic Engineering Metric | COST (METRIC) |
| 6 | Maximum Bandwidth | BAND WIDTH OF LINK |
| 7 | Maximum Reservable Bandwidth | BAND WIDTH THAT CAN BE ACQUIRED |
| 8 | Unreserved Bandwidth | VACANT BAND WIDTH |
| 9 | Administrative Group | GROUP FOR ADMINISTRATION |
| 11 | Link Local/Remote Identifiers | IDENTIFIER OF BOTH LINK ENDS |
| 14 | Link Protection Type | PROTECTION TYPE |
| 15 | Interface Switching Capability Descriptor | SWITCH TYPE AND BAND INFORMATION |
| 16 | Shared Risk Link Group | INFORMATION OF LINKS THAT MAY BE SIMULTANEOUSLY DISABLED |
| VACANT NUMBER | Restriction Information | STORE RESTRICTION INFORMATION OF PATH CONNECTION DESTINATION |

| PORT | RESTRICTION INFORMATION ||
| --- | --- | --- |
| | F Bit | IDENTIFIER VALUE |
| #1 | 1 | 0x01 |
| #2 | 1 | 0x01 |

| PORT | RESTRICTION INFORMATION | |
|---|---|---|
| | F Bit | IDENTIFIER VALUE |
| #1 | 1 | 0x01 |
| #2 | 1 | 0x01 |
| #3-1 | 1 | 0x02 (0b00010) |
| #3-2 | 1 | 0x04 (0b00100) |
| #3-3 | 1 | 0x08 (0b01000) |
| #3-4 | 1 | 0x010 (0b10000) |
| #4 | 1 | 0x01E (0b11110) |

| PORT | RESTRICTION INFORMATION | |
|---|---|---|
| | F Bit | IDENTIFIER VALUE |
| #1 | 1 | 0x01 |
| #2 | 1 | 0x01 |
| #3-1 | 0 | 0x02 (0b00010) |
| #3-2 | 0 | 0x04 (0b00100) |
| #3-3 | 0 | 0x08 (0b01000) |
| #3-4 | 0 | 0x010 (0b10000) |
| #4 | 0 | 0x01E (0b11110) |

| PORT | RESTRICTION INFORMATION | |
|---|---|---|
| | F Bit | IDENTIFIER VALUE |
| #1 | 1 | 0x01 |
| #2 | 1 | 0x01 |
| #3-1 | 1 | 0x02 (0b00010) |
| #3-2 | 1 | 0x04 (0b00100) |
| #3-3 | 1 | 0x08 (0b01000) |
| #3-4 | 1 | 0x010 (0b10000) |
| #4 | 1 | 0x01E (0b11110) |
| #5 | 0 | 0x20 |
| #6 | 0 | 0x20 |
| #7 | 0 | 0x20 |
| #8 | 0 | 0x20 |

| PORT | RESTRICTION INFORMATION | |
|---|---|---|
| | F Bit | IDENTIFIER VALUE |
| #1 | 1 | 0x01 |
| #2 | 1 | 0x01 |
| #3-1 | 1 | 0x02 (0b00010) |
| #3-2 | 1 | 0x04 (0b00100) |
| #3-3 | 1 | 0x08 (0b01000) |
| #3-4 | 1 | 0x010 (0b10000) |
| #4 | 1 | 0x01E (0b11110) |
| #5 | 0 | 0x20 |
| #6 | 0 | 0x20 |
| #7 | 0 | 0x20 |
| #8 | 0 | 0x20 |
| #9 | 0 | 0x40 |
| #10 | 0 | 0x40 |
| #11 | 0 | 0x40 |
| #12 | 0 | 0x40 |

| PORT | RESTRICTION INFORMATION | |
|---|---|---|
| | F Bit | IDENTIFIER VALUE |
| #1 | 0 | 0x01 |
| #2 | 0 | 0x01 |
| #3 | 0 | 0x01 |
| #4 | 0 | 0x01 |
| #5 | 0 | 0x02 |
| #6 | 0 | 0x02 |
| #7 | 0 | 0x02 |
| #8 | 0 | 0x02 |

| PORT | RESTRICTION INFORMATION | |
|---|---|---|
| | F Bit | IDENTIFIER VALUE |
| #1 | 1 | 0x01 |
| #2 | 1 | 0x01 |
| #3-1 | 1 | 0x02 (0b00010) |
| #3-2 | 1 | 0x04 (0b00100) |
| #3-3 | 1 | 0x08 (0b01000) |
| #3-4 | 1 | 0x010 (0b10000) |
| #4 | 1 | 0x01E (0b11110) |
| #5 | 0 | 0x40 |
| #6 | 0 | 0x40 |
| #7 | 0 | 0x40 |
| #8 | 0 | 0x40 |
| #9 | 0 | 0x40 |
| #10 | 0 | 0x40 |
| #11 | 0 | 0x40 |
| #12 | 0 | 0x40 |

COMMUNICATION APPARATUS AND METHOD OF DETERMINING ROUTE

CROSS-REFERENCE TO RELATED APPLICATION

This application is based upon and claims the benefit of priority of the prior Japanese Patent Application No. 2011-086788, filed on Apr. 8, 2011, the entire contents of which are incorporated herein by reference.

FIELD

The embodiments discussed herein are directed to a communication apparatus and a method of determining a route.

BACKGROUND

Conventionally, there is multi-protocol label switching (MPLS) that enables the operation of a network based on end-to-end paths a network including a plurality of nodes by introducing the concept of a label switch to an internet protocol (IP) network. In addition, not only for the IP network, as a technique for operating a network based on various kinds of paths in an autonomous and distributed manner, generalized multi-protocol label switching (GMPLS) is used. The GMPLS operates a time division multiplexing (TDM) network such as a synchronous digital hierarchy (SDH)/synchronous optical network (SONET) in an autonomous and distributed manner. In addition, as another example, the GMPLS operates a wavelength switching network or an optical transport network (OTN) in an autonomous and distributed manner.

In the MPLS or the GMPLS, as a technique for signaling through an end-to-end path, a resource reservation protocol-traffic engineering (RSVP-TE) is used. Specifically, in the MPLS or the GMPLS, a route from a start node to an end node is calculated by using topology information of a network that is collected by open shortest path first extended for traffic engineering (OSPF-TE). Then, in the MPLS or the GMPLS, the RSVP-TE is autonomously transmitted and received between nodes. Accordingly, in the MPLS or the GMPLS, the communication of a main signal is started by stretching a label switched pass (LSP) on the end-to-end. Such a technique has been discussed in the internet engineering task force (IETF), the optical internetworking forum (OIF), the international telecommunication union (ITU), and the like, and a standardization operation thereof is in progress. (see, for example, International Publication Pamphlet No. WO 2004/102903, Japanese Laid-open Patent Publication No. 2008-60755, Japanese Laid-open Patent Publication No. 2008-85642, and International Publication Pamphlet No. WO 2005/101759.)

However, according to a conventional technique, in a network that includes a plurality of nodes, there is a problem in that an error occurs in the selection of a route relating to data transmission. Specifically, according to the conventional technique, in a case where there is a restriction on the connection destination of a route relating to data transmission, it is difficult to calculate a route to which the restriction is applied, and accordingly, an error occurs in the selection of a route relating to the data transmission.

FIG. 25A is an explanatory diagram illustrating a conventional problem occurring in a case where there is a restriction on the connection destination. In FIG. 25A, each node of Node A to Node D, for example, includes ports #1 to #8, and, in a network including the nodes, a cost value is assigned to each route connecting the ports between nodes. The cost value represents a data transmission state in a route up to a node as a link destination and, for example, is a value corresponding to a parameter such as a band, a speed, a distance, or a time relating to communication. FIG. 25A illustrates that a smaller cost value represents a route that is more optimal than other routes. For the calculation of a route, for example, a Dijkstra algorithm, a Bellman-Ford algorithm, or the like may be used, which acquires a shortest route as a constrained shortest path first (CSPF). In the calculation of a route using such an algorithm, a route having the minimum sum of assigned cost values is calculated. Here, it is assumed that all the bands are in a vacant state in each port, and each node maintains topology information that is advertised by the OSPF-TE. Here, the number of ports may be different from node to node.

In FIG. 25A, in Node A and Node D, routes each having a restriction on the connection are denoted by broken lines. Specifically, there are restrictions on the connection destinations between ports #3-1 to #3-4 and port #4 of Node A, and between port #4 and ports #3-1 to #3-4 of Node D. In the description of FIG. 25A, for example, a case will be described in which a start point is port "#1" of Node A and an end point is port "#1" of Node D in a network including a plurality of nodes from Node A to Node D. In addition, it is assumed that the calculation of a route is performed by Node A.

In the above-described configuration, Node A calculates a route in which the sum of assigned cost values is the minimum. As the route selected as above, a route is selected in the order of "port "#1" and "#2" of Node A", "ports "#1" and "#4" of Node B", and "port "#4" of Node D". As a result, in the network illustrated in FIG. 25A, a route denoted by a dotted line is selected. Here, in Node D, connection destinations that can be connected to port #4 are ports #3-1 to #3-4. Thus, according to a conventional technique, in the network illustrated in FIG. 25A, it is difficult to select a route reaching port #1 of Node D as the end point, so that an error occurs. In addition, the route that is to be originally selected is a route, which is denoted by a solid line illustrated in FIG. 25A, passing through port #3 of Node B.

Accordingly, a supervisor is aware of the presence of a node having a restriction on the connection destination within the network and sets information that selects a route passing through a specific port. FIG. 25B is a diagram illustrating an example in which information used for selecting a route passing through a specific port. In the example illustrated in FIG. 25B, a supervisor, for example, sets information used for selecting a route passing through port #2 of Node A and port #2 of Node D. For example, the information used for selecting a route passing through a specific port may be referred to as "Include designation". In FIG. 25B, ports that are designated for "Include designation" are denoted by black circles. Node A, as illustrated in FIG. 25B, selects a route that includes "ports "#1" and "#3" of Node B" based on "Include designation".

However, originally, one of the advantages of the MPLS or the GMPLS is to autonomously calculate a route without involving a supervisor therein. However, when a system is configured such that the supervisor-has to set "Include designation" and additional maintenance step will be added to a conventional one for considering the setting of "Include designation" to a specific port of a specific node. In addition, "Include designation" may be set when a restriction is newly set in a network in which there has been originally no restriction. When a restriction is newly set, a maintenance sequence for performing setting not using the GMPLS is required, compared to a conventional case.

SUMMARY

According to an aspect of an embodiment of the invention, a communication apparatus includes a memory that stores topology information shared by nodes included in a network and representing connection states between the nodes, the topology information including port identification information used for identifying ports that are connectable to each other within each node; and a processor that determines a route by sequentially selecting a port that can be connected to a port, to which transmission data is input, within each node, based on the port identification information stored in the memory.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a diagram illustrating an overview of a Sub-TLV;

DESCRIPTION OF EMBODIMENTS

Preferred embodiments of the present invention will be explained with reference to accompanying drawings.

In addition, the invention is not limited to embodiments described hereinafter.

[a] First Embodiment

Hardware Configuration of Communication Apparatus

Figure 1:
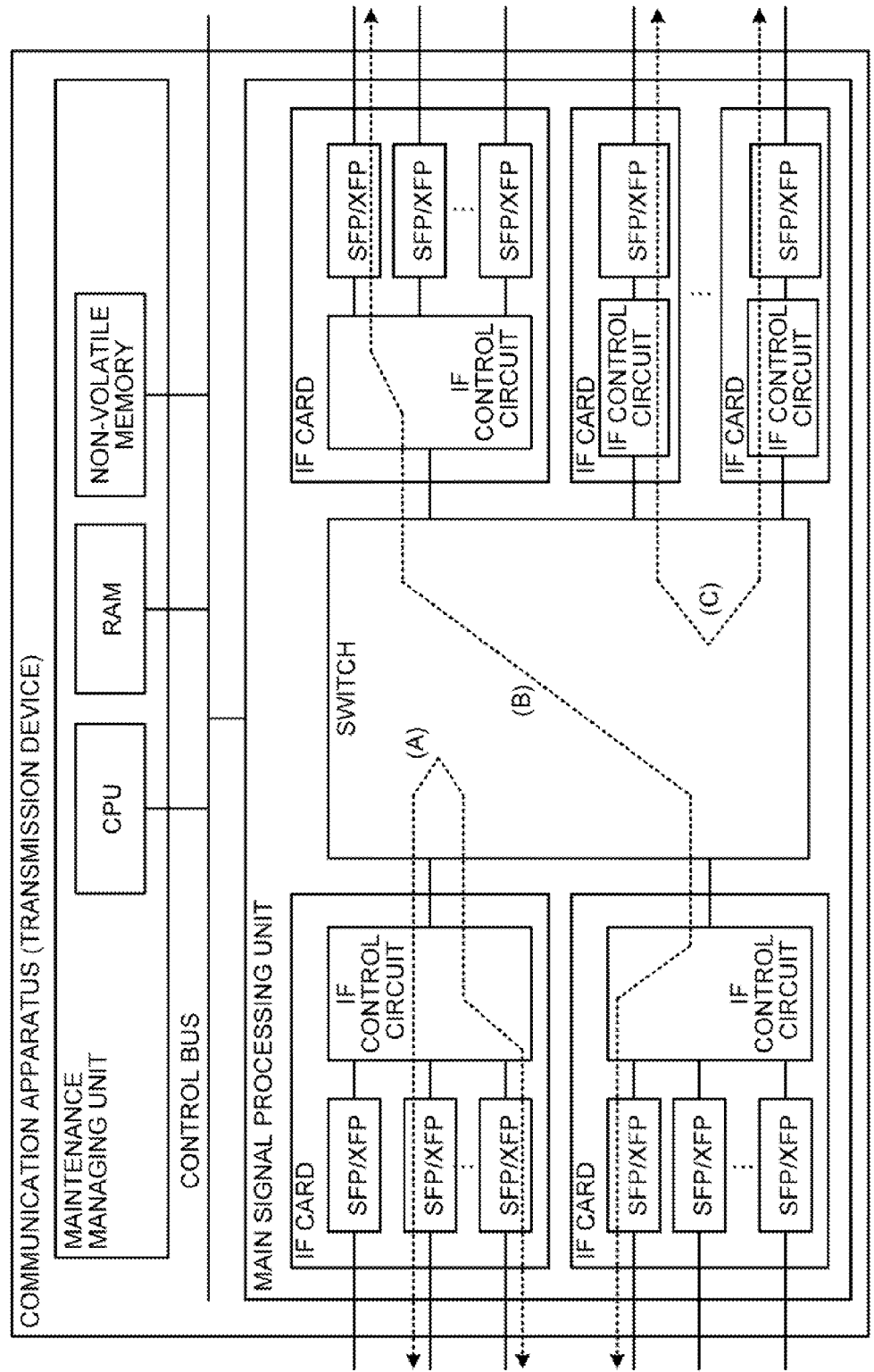
FIG. 1 is a diagram illustrating an example of the hardware configuration of a communication apparatus that passes through a switch.
Figure 2:
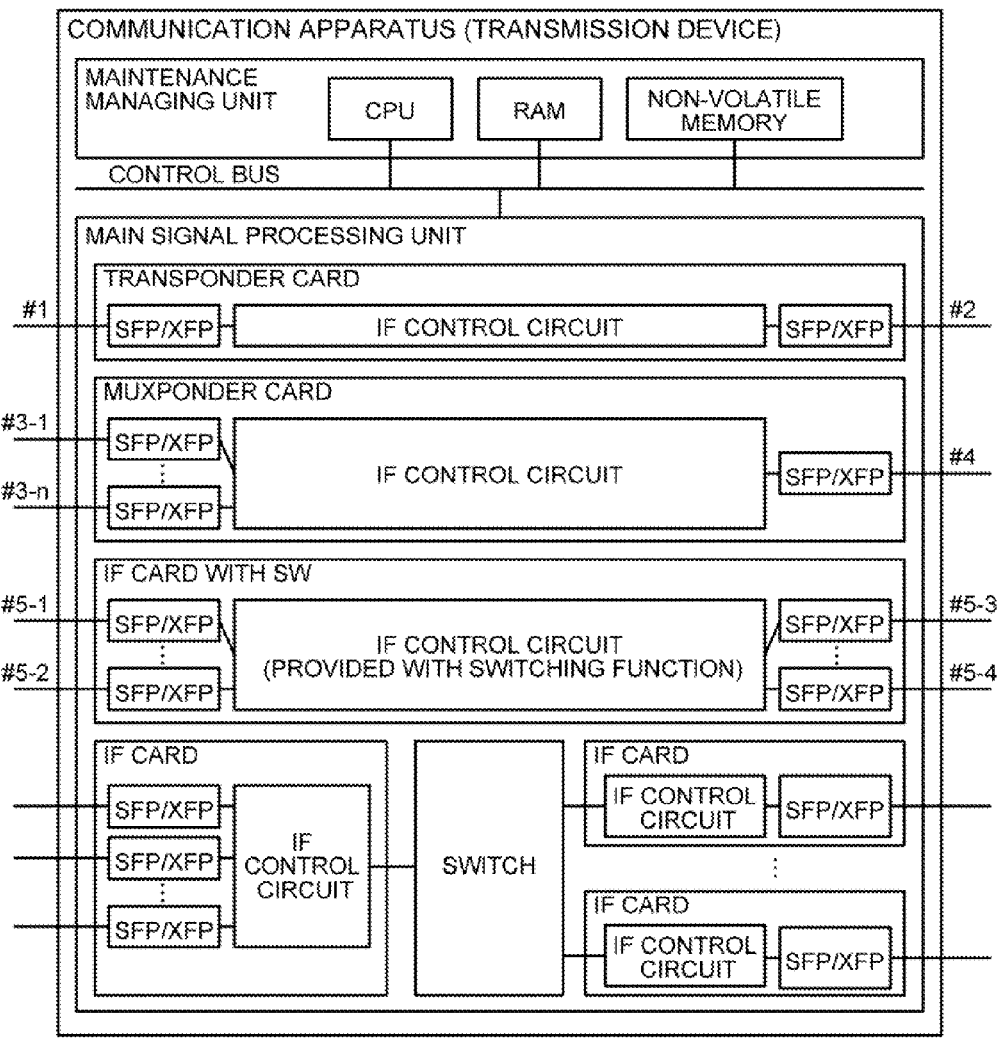
FIG. 2 is a diagram illustrating an example of the hardware configuration of a communication apparatus that does not pass through a switch.

Hereinafter, the hardware configuration of a communication apparatus according to a first embodiment will be described with reference to FIGS. 1 and 2. FIG. 1 is a diagram illustrating an example of the hardware configuration of the communication apparatus that passes through a switch. FIG. 2 is a diagram illustrating an example of the hardware configuration of the communication apparatus that does not pass through a switch.

For example, as illustrated in FIG. 1, the communication apparatus includes a maintenance managing unit and a main signal processing unit. Out of these units, the maintenance managing unit, for example, includes a central processing unit (CPU), a random access memory (RAM), and a non-volatile memory such as a flash memory or a compact flash (CF). In addition, the maintenance managing unit performs overall control of the CPU, the RAM, and the non-volatile memory and performs monitoring, various settings, and the like of the entire apparatus through a control bus.

Meanwhile, the main signal processing unit, for example, includes an interface (IF) card and a switch. For example, the switch is a switch (SW) card that has a cross-connecting function. The IF card, for example, includes a small form factor pluggable (SFP)/10 gigabit small form factor pluggable (XFP) and an IF control circuit. The SFP/XFP, for example, is in compliance with various main signal specifications and inputs and outputs various main signals. The IF control circuit, for example, performs a process according to each frame format. In other words, the main signal processing unit performs control relating to synchronous optical network (SONET)/a synchronous digital hierarchy (SDH) in the case of a SONET/SDH signal and performs control relating to an optical transport network (OTN) in the case of an OTN signal. The SFP/XFP and the IF control circuit may be included in one card, and the number of the SFP/XFPs is different in accordance with the number of ports that can be supported within the same card. The switch is connected to all of the IF control circuits for the communication of a main signal between arbitrary ports within the apparatus. In addition, the switch, similarly to the IF card, may be included in one card. Accordingly, as a mode of the communication apparatus that has a switch, paths (A), (B), (C), and the like illustrated in FIG. 1 can be set.

In addition, for example, as illustrated in FIG. 2, the communication apparatus includes a maintenance managing unit and a main signal processing unit. Out of these units, the maintenance managing unit, for example, includes a CPU, a RAM, and a non-volatile memory and performs monitoring, various settings, and the like of the entire apparatus through a control bus by performing overall control thereof.

Meanwhile, the main signal processing unit, for example, includes a transponder card, a muxponder card, an IF card (IF card with SW) having a SW function, and an IF card connected to a switch. The transponder card, for example, is a card to which port #1 and port #2 are fixedly assigned as one-to-one correspondence and which can be connectable only between the ports. The muxponder card is a card that multiplexes a reception signal, for example, input from a plurality of ports #3-1 to #3-n (here, n is a natural number) and transmits a resultant signal to port #4 and has a connection destination that is fixedly assigned. In addition, there is a case where the muxponder card separates a signal that is input in the opposite direction, in other words, input from port #4 and transmits resultant signals to ports #3-1 to #3-n. The IF card having the SW function is a card that can freely determine the connection destination, for example, out of ports #5-1 to #5-4 arranged inside the card but is not connected to a port of any other card. In addition, the IF card connected to the switch performs the same process as that of the card illustrated in FIG. 1.

Functional Blocks of Communication Apparatus

Figure 3:
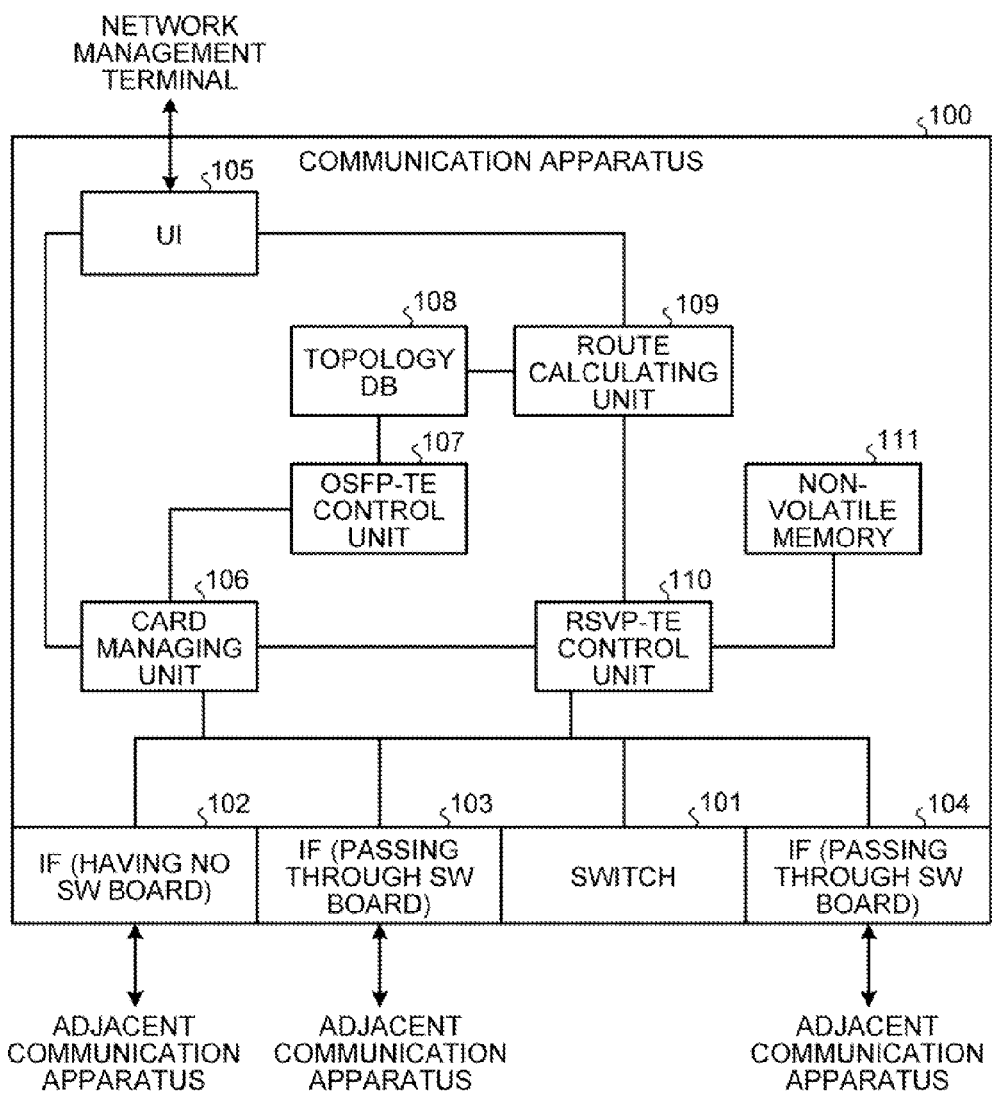
FIG. 3 is a diagram illustrating an example of the functional blocks of a communication apparatus according to a first embodiment.

Next, the functional blocks of the communication apparatus according to the first embodiment will be described with reference to FIG. 3. FIG. 3 is a diagram illustrating an example of the functional blocks of the communication apparatus according to the first embodiment.

For example, as illustrated in FIG. 3, a communication apparatus 100 includes a switch 101, an IF 102, an IF 103, and an IF 104. Out of these, the IF 102 is an interface that does not have a SW board, the IF 103 is an interface that passes through an SW board, and the IF 104 is an interface that passes through a SW board. In addition, for example, the communication apparatus 100 includes a user interface (UI) 105, a card managing unit 106, an OSPF-TE control unit 107, a topology database (DB) 108, a route calculating unit 109, an RSVP-TE control unit 110, and a non-volatile memory 111.

Out of these, the IF 102 is an example of an IF control circuit such as the transponder card, the muxponder card, the IF card with SW, or the like illustrated in FIG. 2. In addition, the switch 101, the IF 103, and the IF 104 are examples of the IF control circuit that passes through a switch illustrated in FIG. 1. Furthermore, the processes in the UI 105, the card managing unit 106, the OSPF-TE control unit 107, the route calculating unit 109, and the RSVP-TE control unit 110 are performed by using a processor such as the CPU illustrated in FIG. 1 or 2. In addition, the topology DB 108 is stored in a memory such as the RAM illustrated in FIG. 1 or 2. Furthermore, the non-volatile memory 111 is an example of the non-volatile memory illustrated in FIG. 1 or 2.

In the IF 102 and the IF 103, for example, as descried with reference to FIGS. 1 and 2, a main signal flows through the switch 101. In addition, in the IF 104, for example, as described with reference to FIGS. 1 and 2, a main signal flows not through the switch 101. The IF 102, the IF 103, and the IF 104, for example, are connected to an adjacent communication apparatus and control communication using a main signal such as a data packet or an IP packet for the RSVP-TE or the OSPF-TE control. In addition, the RSVP-TE is a signaling protocol, and the OSPF-TE is a routing protocol.

The UI 105 receives various commands, for example, from a network management terminal such as an operation system (OPS) that is connected to the communication apparatus 100. Examples of the various commands include a setting request relating to the IF card such as the switch 101, the IF 102, the IF 103, or the IF 104, a request for calculating a route in a network including the communication apparatus 100, and the like. In addition, for example, the various commands are used also in a case where a restriction on the transmission route is intentionally set by a user or a case where a restriction is removed. Furthermore, the UI 105 informs the network management terminal of information relating to the IF card such as the switch 101, the IF 102, the IF 103, or the IF 104 that is collected by the card managing unit 106.

For example, in a case where a setting request relating to the IF card is received through the UI 105, the card managing unit 106 notifies the OSPF-TE control unit 107 of the setting request. The setting request relating to the IF card is made, for example, in a case where an IF card is registered or removed. In addition, in the registration of an IF card, there is also a case where an IF card having a specific restriction is registered. For example, when the notification is received from the card managing unit 106, the OSPF-TE control unit 107 generates topology information in accordance with the type of the IF card, updates the topology DB 108 in which the topology information is stored, and advertises the updated topology information to adjacent communication apparatuses. In addition, also in a case where a restriction is set or removed by a user through the card managing unit 106, the OSPF-TE control unit 107 generates topology information in accordance with the setting or removing thereof, updates the topology DB 108, and advertises the updated topology information to adjacent communication apparatuses. The topology DB 108 stores the topology information such as opaque link-state advertisement (LSA) that includes, for example, a restriction information Sub-type length value (TLV) therein.

In the generation of the topology information, the Opaque LSA including the restriction information Sub-TLV is generated. Hereinafter, the restriction information Sub-TLV may be referred to as "Rest Info". In addition, in a case where the topology information advertised by another communication apparatus adjacent thereto is received, the OSPF-TE control unit 107 updates the topology DB 108. Accordingly, in the network including the communication apparatus 100, the same topology information is shared by communication apparatuses.

The configuration of the topology information that is used in the calculation of a route, which will be described later, is specified in Request For Comment (RFC) 3630, 4202, 4230, and the like. Here, the topology information is defined as the Opaque LSA. In the Opaque LSA, various types of information are stored in a format called TLV defined for the GMPLS so as to respond to the functional expansion.

Figures 4A, 4B:
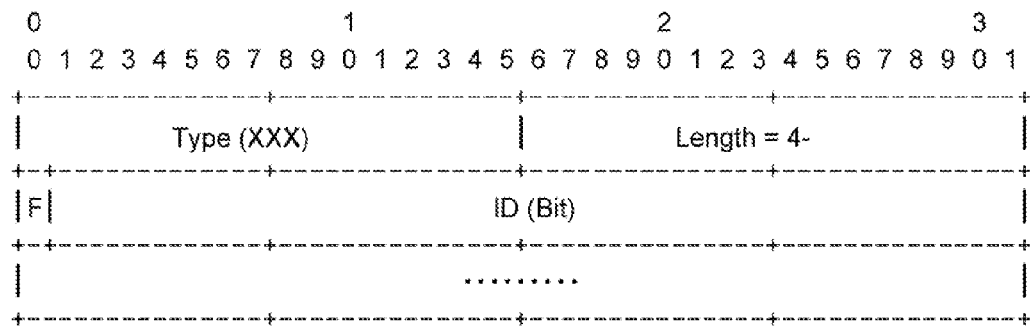
FIG. 4A is a diagram illustrating an example of the configuration of a restriction information Sub-TLV.
FIG. 4B is a diagram illustrating an example of the configuration of a restriction information Sub-TLV.

FIGS. 4A and 4B are diagrams illustrating an example of the configuration of the restriction information Sub-TLV. For example, as illustrated in FIG. 4A, the Rest Info is stored in a Sub-TLV acquired by expanding a vacant portion separately from the Sub-TLVs that are present under the Link TLV. In addition, as illustrated in FIG. 4B, the Sub-TLV in which the Rest Info is stored includes "Type" in which a specified value is used, "Length" that represents the size of the TLV, and "F" and "ID" that are used by a rule specified in accordance with each "Type" value. In addition, as illustrated in FIG. 4B, although the "Length" is set to be "4" or more, the "Length" may be changed in accordance with the number of types of the "IDs". Furthermore, "F" is information that represents whether or not a connectable port inside the communication apparatus 100 is fixed to one, and, for example, "1" is stored therein in a case where the connectable port is fixed to one, and "0" is stored therein in a case where there are a plurality of connectable ports. In addition, identification information that is used for identifying ports that can be connectable to each other inside the communication apparatus 100 is stored in "ID". "F" and "ID" will be described in detail later.

Figure 5:
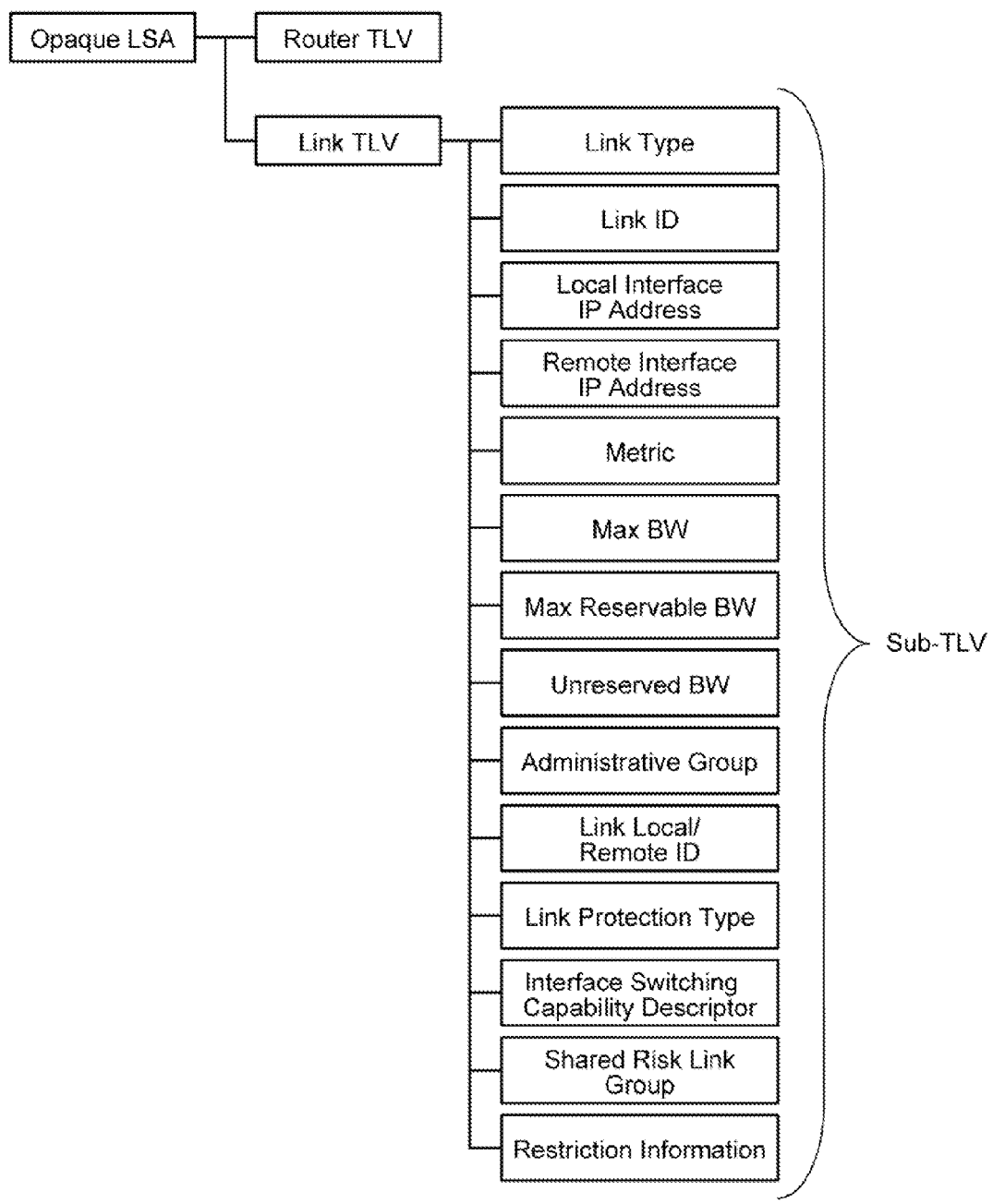
FIG. 5 is a diagram illustrating a configuration example of an Opaque LSA.

The TLV can be arranged in a nested structure, and there is a case where "Router TLV" representing node information and "Link TLV" representing link information are used. FIG. 5 is a diagram illustrating a configuration example of the Opaque LSA. FIG. 6 is a diagram illustrating an overview of the Sub-TLV. For example, as illustrated in FIG. 5, in the Opaque LSA, a router LSA including a "Router TLV" and a Link LSA including a "Link TLV" are present. Out of these, the Link LSA is a set of a plurality of Sub-TLVs and is advertised to nodes within the network as one LSA and includes the Rest Info as well. In addition, as illustrated in FIG. 6, in the Sub-TLV, various types of information relating to links and nodes are present in sections defined as standard, and the information of the Rest Info is present in a section of an expanded vacant number. Furthermore, "Traffic Engineering Metric" of a Sub-TLV type of "5", which is illustrated in FIG. 6, is information of cost values of links used for the route calculation.

Figures 7A, 7B:
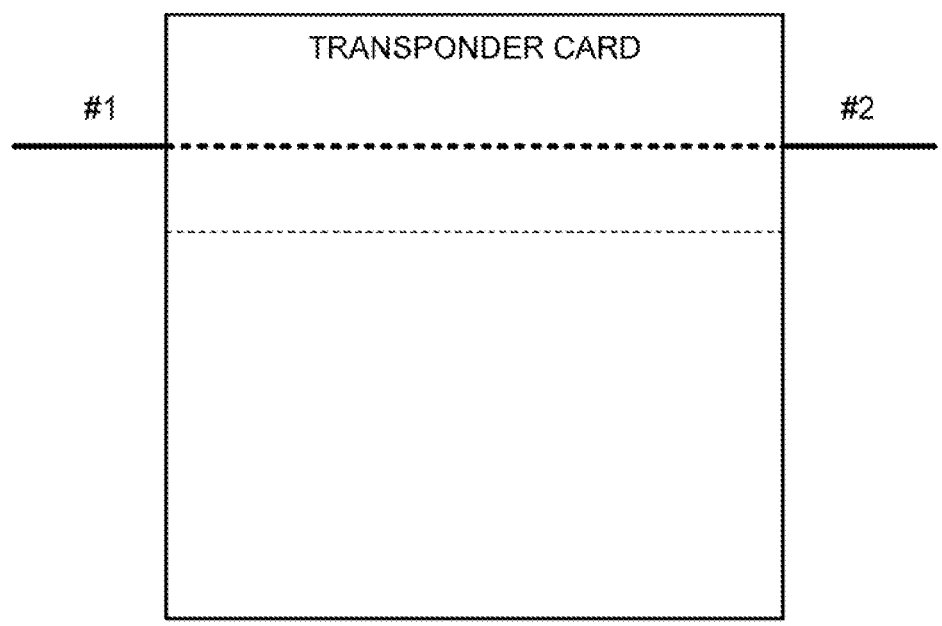
FIG. 7A is a diagram illustrating a configuration example of a transponder card.
FIG. 7B is a diagram illustrating an example of restriction information that is set in accordance with the transponder card illustrated in FIG. 7A.

Here, the Rest Info that is set in accordance with the type of the IF card will be described with reference to FIGS. 7A to 13B. FIG. 7A is a diagram illustrating a configuration example of the transponder card. FIG. 7B is a diagram illustrating an example of the restriction information that is set in accordance with the transponder card illustrated in FIG. 7A.

For example, in the transponder card illustrated in FIG. 7A, a port that can be connected for port "#1" to which data is input is port "#2". In addition, in the transponder card illustrated in FIG. 7A, a port that can be connected for port "#2" to which data can be connected is port "#1". In such a case, the OSPF-TE control unit 107, as illustrated in FIG. 7B, in the setting of the Rest Info, stores port "#1", F Bit "1", and ID "0x01" in association with one another. In addition, the OSPF-TE control unit 107 stores port "#2", F Bit "1", and ID "0x01" are stored in association with one another. In other words, the Rest Info illustrated in FIG. 7B represents that a connectable port of port "#1" is fixed to one, and the connectable port is a port that has an ID of "0x01". Similarly, it is represented that a connectable port of port "#2" is fixed to one, and the connectable port is a port that has an ID of "0x01".

Figures 8A, 8B:
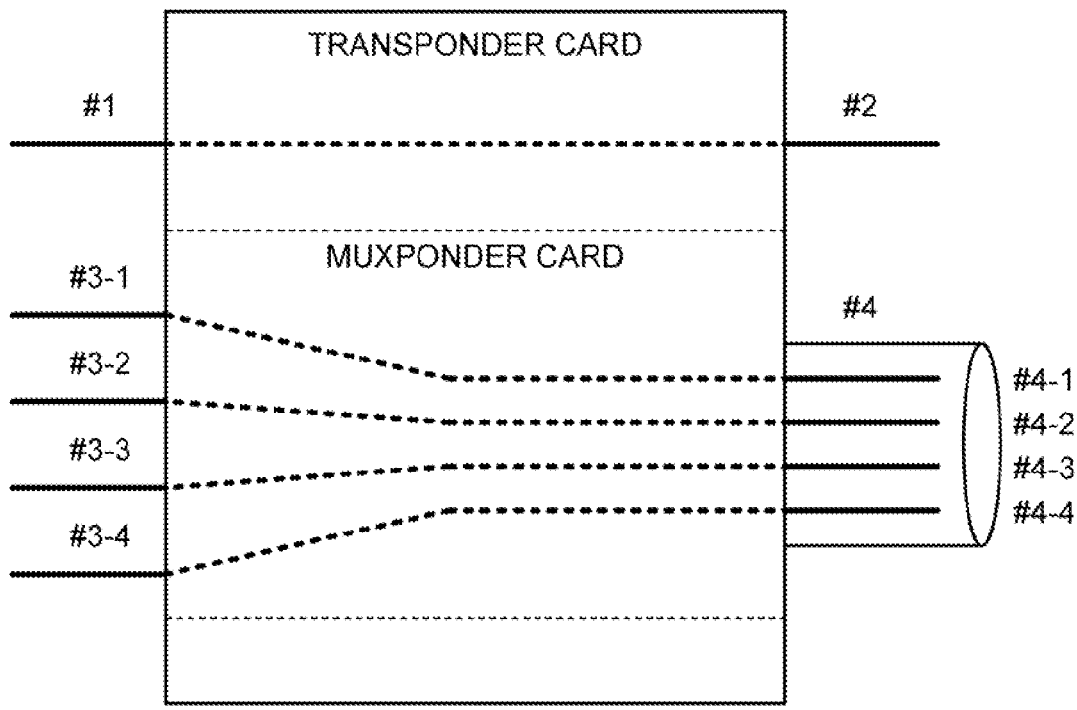
FIG. 8A is a diagram illustrating a configuration example of a muxponder card.
FIG. 8B is a diagram illustrating an example of restriction information that is set in accordance with the muxponder card illustrated in FIG. 8A.

FIG. 8A is a diagram illustrating a configuration example of a muxponder card. FIG. 8B is a diagram illustrating an example of the restriction information that is set in accordance with the muxponder card illustrated in FIG. 8A. Since the IF card described with reference to FIGS. 7A and 7B is included in FIGS. 8A and 8B, the description thereof will not be repeated here.

For example, in the muxponder card illustrated in FIG. 8A, a connectable port for port "#3-1", "#3-2", "#3-3", or "#3-4" to which data is input is port "#4". In addition, in the muxponder card illustrated in FIG. 8A, a connectable port for port "#4" to which data is input is any one of ports "#3-1", "#3-2", "#3-3", and "#3-4". In conclusion, in the muxponder card illustrated in FIG. 8A, ports, in which a plurality of ports as multiplexing sources and a port as a multiplexing destination can be connected so as to have the "n-to-1" relation, are fixed. Described in detail, "ports #3-1" to "#3-4" are fixedly connected to ports "#4-1" to "#4-4". In such a case, the OSPF-TE control unit 107, as illustrated in FIG. 8B, in setting of the Rest Info, stores port "#3-1", F Bit "1", and ID "0x02 (0b00010)" in association with one another. In addition, the OSPF-TE control unit 107, stores port "#3-2", F Bit "1", and ID "0x04 (0b00100)" in association with one another. Furthermore, the OSPF-TE control unit 107 stores port "#3-3", F Bit "1", and ID "0x08 (0b01000)" in association with one another. In addition, the OSPF-TE control unit 107 stores port "#3-4", F Bit "1", and ID "0x10 (0b10000)" in association with one another. Furthermore, the OSPF-TE control unit 107 stores port "#4", F Bit "1", and ID "0x1E (0b11110)" in association with one another. In other words, the OSPF-TE control unit 107 assigns unique IDs to a plurality of ports as the multiplexing sources inside the communication apparatus 100 and assigns a value acquired by calculating OR of all the ID values set to the multiplexing sources to the port as the multiplexing destination. In addition, as described above, since port #4, that is, ports #4-1 to #4-4, described in detail, are fixedly connected to ports "#3-1" to "#3-4", "1" is assigned to the F Bits. Furthermore, since ID "0x01" is used in ports "#1" and "#2", the OSPF-TE control unit 107 uses IDs "0x02", "0x04", "0x08", and "0x10". Although "0x01", "0x02", "0x03", . . . may be used for the IDs, by using "0x02", "0x04", . . . for the IDs in consideration of the bit, it can be represented that a plurality of ports can be connected to one port.

In other words, in the Rest Info illustrated in FIG. 8B, port "#3-1" is represented that the number of connectable ports is fixed to one, and the connectable port is a port that has "1" at the same bit position as that of "1" in ID "0b00010". Similarly, port "#3-2" is represented that the number of connectable ports is fixed to one, and the connectable port is a port that has "1" at the same bit position as that of "1" in ID "0b00100". Similarly, port "#3-3" is represented that the number of connectable ports is fixed to one, and the connectable port is a port that has "1" at the same bit position as that of "1" in ID "0b01000". Similarly, port "#3-4" is represented that the number of connectable ports is fixed to one, and the connectable port is a port that has "1" at the same bit position as that of "1" in ID "0b10000". Similarly, port "#4" is represented that the number of connectable ports is fixed to one, and the connectable port is a port that has "1" at the same bit position as that of "1" in ID "0b11110".

Figures 9A, 9B:
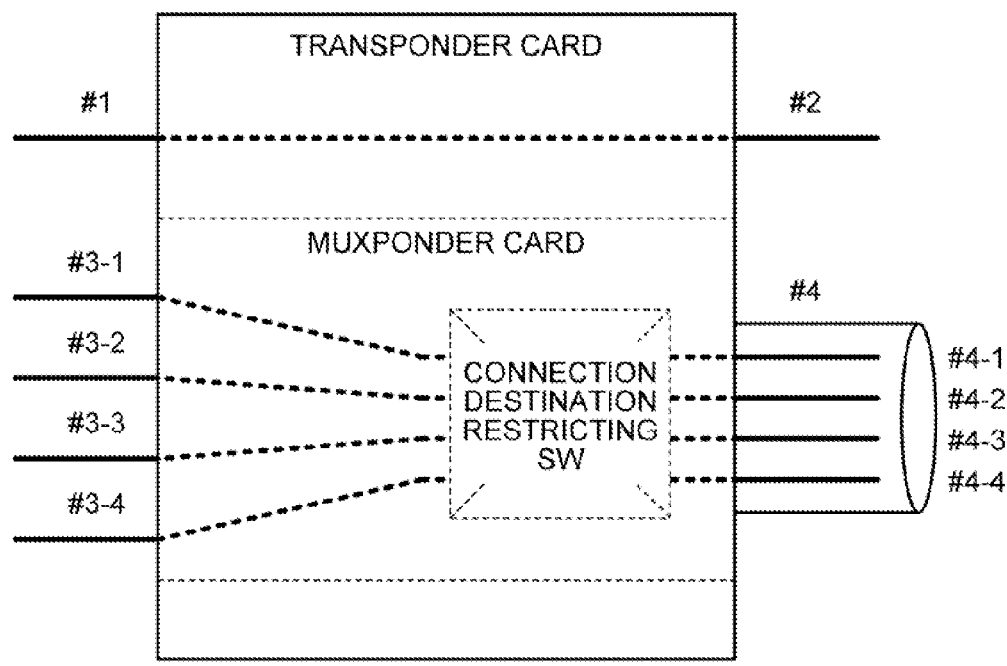
FIG. 9A is a diagram illustrating a configuration example of a muxponder card in which a SW, in which a connection destination is restricted, is built.
FIG. 9B is a diagram illustrating an example of the restriction information that is set in accordance with the muxponder card illustrated in FIG. 9A.

FIG. 9A is a diagram illustrating a configuration example of a muxponder card in which a SW, in which a connection destination is restricted, is built. FIG. 9B is a diagram illustrating an example of the restriction information that is set in accordance with the muxponder card illustrated in FIG. 9A. Since the IF card described with reference to FIGS. 7A and 7B is included in FIGS. 9A and 9B, the description thereof will not be repeated here.

For example, in the muxponder card illustrated in FIG. 9A, a connectable port for port "#3-1", "#3-2", "#3-3", or "#3-4" to which data is input is port "#4-1", "#4-2", "#4-3", or "#4-4". In addition, in the muxponder card illustrated in FIG. 9A, a connectable port for port "#4-1", "#4-2", "#4-3", or "#4-4" to which data is input is port "#3-1", "#3-2", "#3-3", or "#3-4". In conclusion, in the muxponder card illustrated in FIG. 9A, a plurality of ports are present as the multiplexing destinations for a plurality of ports as multiplexing sources, and the connections are changed by the SW, but the connection destination is restricted. In such a case, the OSPF-TE control unit 107, as illustrated in FIG. 9B, in setting of the Rest Info, stores port "#3-1", F Bit "0", and ID "0x02 (0b00010)" in association with one another. In addition, the OSPF-TE control unit 107 stores port "#3-2", F Bit "0", and ID "0x04 (0b00100)" in association with one another. Furthermore, the OSPF-TE control unit 107 stores port "#3-3", F Bit "0", and ID "0x08 (0b01000)" in association with one another. In addition, the OSPF-TE control unit 107 stores port "#3-4", F Bit "0", and ID "0x10 (0b10000)" in association with one another. Furthermore, the OSPF-TE control unit 107 stores port "#4", F Bit "0", and ID "0x1E (0b11110)" in association with one another. In other words, in the OSPF-TE control unit 107, it is represented that the connection destination is not fixed to one by setting the F Bit to "0", and a connection destination as a multiplexing destination can be selected.

In other words, in the Rest Info illustrated in FIG. 9B, port "#3-1" is represented that there are a plurality of connectable ports, and the connectable ports are ports having "1" at the same bit position as "1" in ID "0b00010". Similarly, port "#3-2" is represented that there are a plurality of connectable ports, and the connectable ports are ports having "1" at the same bit position as "1" in ID "0b00100". Similarly, port "#3-3" is represented that there are a plurality of connectable ports, and the connectable ports are ports having "1" at the same bit position as "1" in ID "0b01000". Similarly, port "#3-4" is represented that there are a plurality of connectable ports, and the connectable ports are ports having "1" at the same bit position as "1" in ID "0b10000". Similarly, port "#4" is represented that there are a plurality of connectable ports, and the connectable ports are ports having "1" at the same bit position as "1" in ID "0b11110".

Figures 10A, 10B:
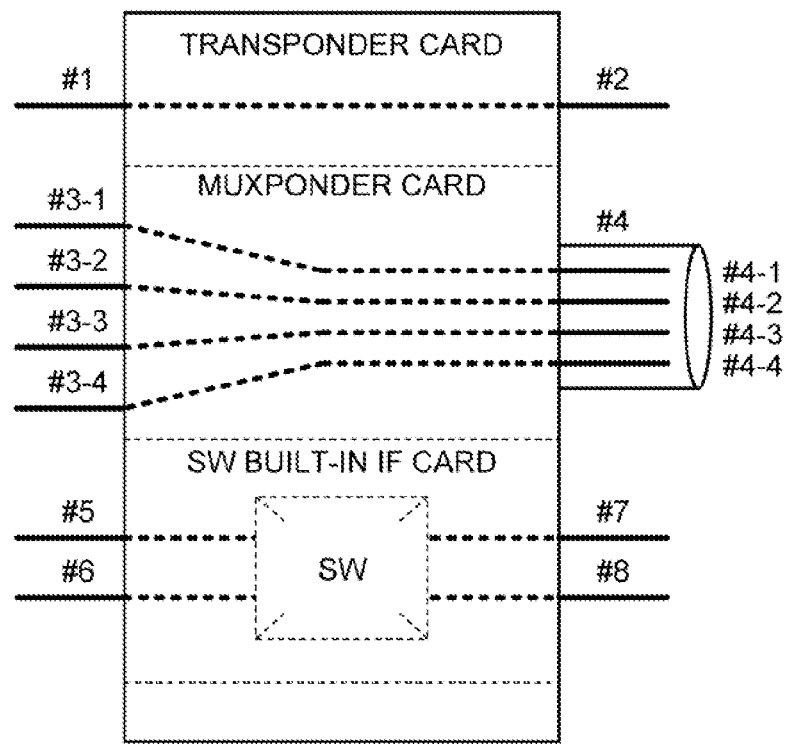
FIG. 10A is a diagram illustrating a configuration example of an IF card in which a SW is built.
FIG. 10B is a diagram illustrating an example of restriction information that is set in accordance with the IF card illustrated in FIG. 10A.

FIG. 10A is a diagram illustrating a configuration example of an IF card in which a SW is built. FIG. 10B is a diagram illustrating an example of the restriction information that is set in accordance with the IF card illustrated in FIG. 10A. Since the IF card described with reference to FIGS. 7A to 8B is included in FIGS. 10A and 10B, the description thereof will not be repeated here.

For example, in the IF card illustrated in FIG. 10A, connectable ports for port "#5", "#6", "#7", or "#8" to which data is input are ports other than the input port. In such a case, the OSPF-TE control unit 107, as illustrated in FIG. 10B, in setting of the Rest Info, stores port "#5", F Bit "0", and ID "0x20" in association with one another. In addition, the OSPF-TE control unit 107 stores port "#6", F Bit "0", and ID "0x20" in association with one another. Furthermore, the OSPF-TE control unit 107 stores port "#7", F Bit "0", and ID "0x20" in association with one another. In addition, the OSPF-TE control unit 107 stores port "#8", F Bit "0", and ID "0x20" in association with one another.

In other words, in the Rest Info illustrated in FIG. 10B, port "#5" is represented that there are a plurality of connectable ports, and the connectable ports are ports having ID "0x20". Similarly, port "#6" is represented that there are a plurality of connectable ports, and the connectable ports are ports having ID "0x20". Similarly, port "#7" is represented that there are a plurality of connectable ports, and the connectable ports are ports having ID "0x20". Similarly, port "#8" is represented that there are a plurality of connectable ports, and the connectable ports are ports having ID "0x20".

Figures 11A, 11B:
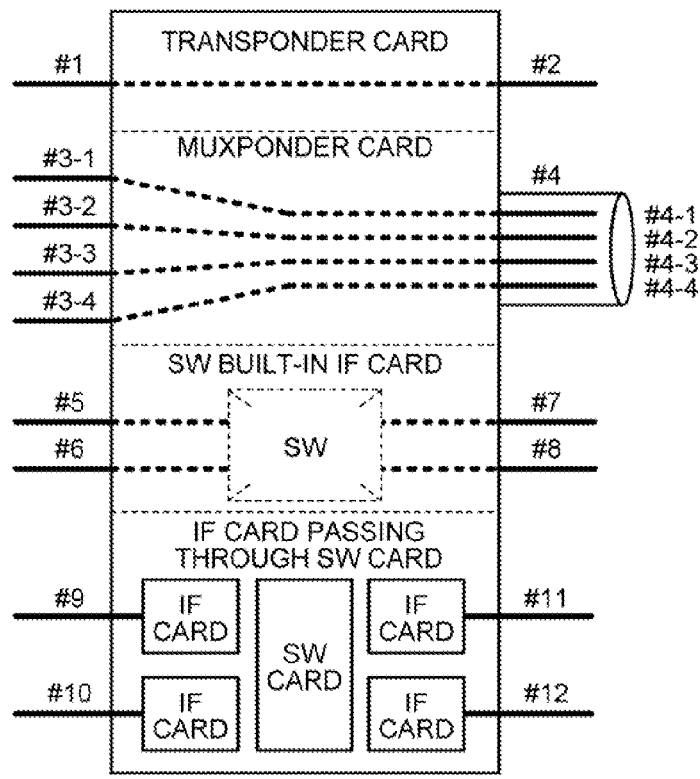
FIG. 11A is a diagram illustrating a configuration example of an IF card that passes through a SW card.
FIG. 11B is a diagram illustrating an example of restriction information that is set in accordance with the IF card illustrated in FIG. 11A.

FIG. 11A is a diagram illustrating a configuration example of an IF card that passes through a SW card. FIG. 11B is a diagram illustrating an example of the restriction information that is set in accordance with the IF card illustrated in FIG. 11A. Since the IF card described with reference to FIGS. 7A to 8B, 10A, and 10B is included in FIGS. 11A and 11B, the description thereof will not be repeated here.

For example, in the IF card illustrated in FIG. 11A, connectable ports for port "#9", "#10", "#11", or "#12" to which data is input are ports other than the input port by passing through the SW card. In such a case, the OSPF-TE control unit 107, as illustrated in FIG. 11B, in setting of the Rest Info, stores port "#9", F Bit "0", and ID "0x40" in association with one another. In addition, the OSPF-TE control unit 107 stores port "#10", F Bit "0", and ID "0x40" in association with one another. Furthermore, the OSPF-TE control unit 107 stores port "#11", F Bit "0", and ID "0x40" in association with one another. In addition, the OSPF-TE control unit 107 stores port "#12", F Bit "0", and ID "0x40" in association with one another.

In other words, in the Rest Info illustrated in FIG. 11B, port "#9" is represented that there are a plurality of connectable ports, and the connectable ports are ports having ID "0x40". Similarly, port "#10" is represented that there are a plurality of connectable ports, and the connectable ports are ports having ID "0x40". Similarly, port "#11" is represented that there are a plurality of connectable ports, and the connectable ports are ports having ID "0x40". Similarly, port "#12" is represented that there are a plurality of connectable ports, and the connectable ports are ports having ID "0x40".

Figures 12A, 12B:
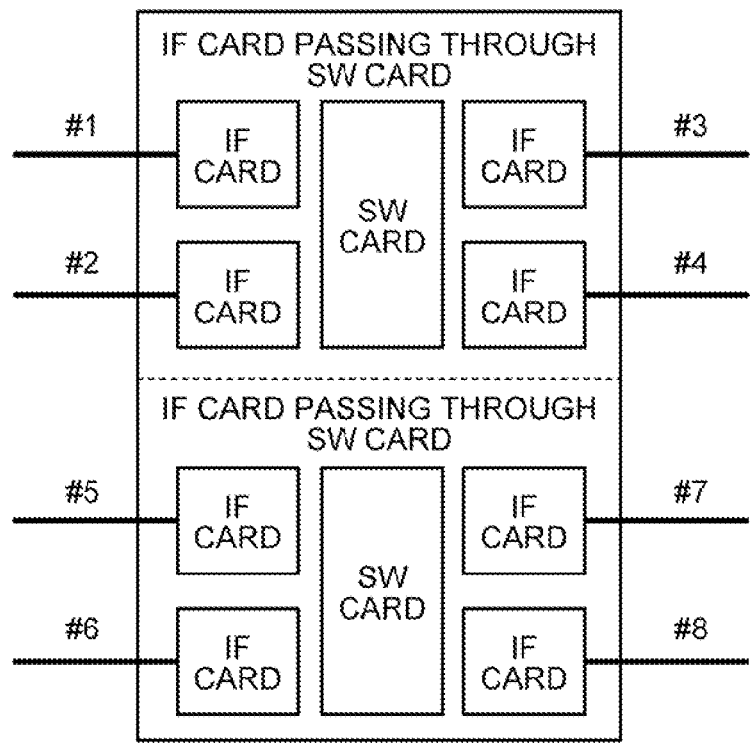
FIG. 12A is a diagram illustrating a configuration example of an IF card, which has a restriction, passing through a SW card.
FIG. 12B is a diagram illustrating an example of restriction information that is set in accordance with the IF card illustrated in FIG. 12A.

FIG. 12A is a diagram illustrating a configuration example of an IF card, which has a restriction, passing through a SW card. FIG. 12B is a diagram illustrating an example of the restriction information that is set in accordance with the IF card illustrated in FIG. 12A.

For example, in the IF card illustrated in FIG. 12A, by passing through the SW card, connectable ports for port "#1", "#2", "#3", or "#4" to which data is input are ports other than the input port. In addition, in the IF card illustrated in FIG. 12A, by passing through the SW card, connectable ports for port "#5", "#6", "#7", or "#8" to which data is input are ports other than the input port. In conclusion, the reason why there is a restriction is, for example, due to the employment of a system in which a chassis that houses a plurality of cards therein is expanded, and the plurality of chassis are managed as one node. As above, in a case where the plurality of chassis are managed as one node, connectable ports are set in units of chassis.

In such a case, the OSPF-TE control unit 107, as illustrated in FIG. 12B, in setting of the Rest Info, stores port "#1", F Bit "0", and ID "0x01" in association with one another. In addition, the OSPF-TE control unit 107 stores port "#2", F Bit "0", and ID "0x01" in association with one another. Furthermore, the OSPF-TE control unit 107 stores port "#3", F Bit "0", and ID "0x01" in association with one another. In addition, the OSPF-TE control unit 107 stores port "#4", F Bit "0", and ID "0x01" in association with one another. Furthermore, the OSPF-TE control unit 107 stores port "#5", F Bit "0", and ID "0x02" in association with one another. In addition, the OSPF-TE control unit 107 stores port "#6", F Bit "0", and ID "0x02" in association with one another. Furthermore, the OSPF-TE control unit 107 stores port "#7", F Bit "0", and ID "0x02" in association with one another. In addition, the OSPF-TE control unit 107 stores port "#8", F Bit "0", and ID "0x02" in association with one another.

In other words, in the Rest Info illustrated in FIG. 12B, port "#1" is represented that there are a plurality of connectable ports, and the connectable ports are ports having ID "0x01". Similarly, port "#2" is represented that there are a plurality of connectable ports, and the connectable ports are ports having ID "0x01". Similarly, port "#3" is represented that there are a plurality of connectable ports, and the connectable ports are ports having ID "0x01". Similarly, port "#4" is represented that there are a plurality of connectable ports, and the connectable ports are ports having ID "0x01". Similarly, port "#5" is represented that there are a plurality of connectable ports, and the connectable ports are ports having ID "0x02". Similarly, port "#6" is represented that there are a plurality of connectable ports, and the connectable ports are ports having ID "0x02". Similarly, port "#7" is represented that there are a plurality of connectable ports, and the connectable ports are ports having ID "0x02". Similarly, port "#8" is represented that there are a plurality of connectable ports, and the connectable ports are ports having ID "0x02".

Figures 13A, 13B:
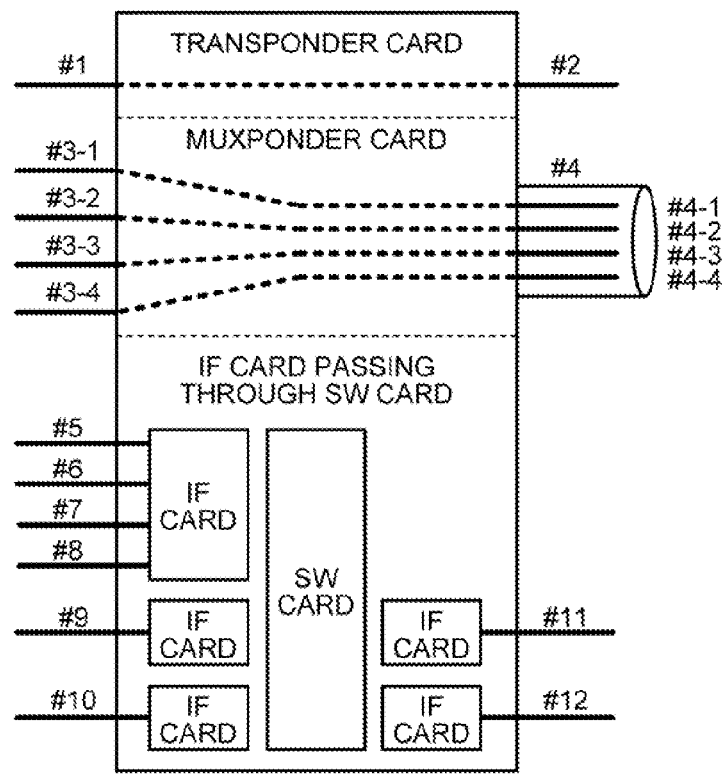
FIG. 13A is a diagram illustrating a configuration example of an IF card in a case where the IF card having the SW illustrated in FIG. 11A built therein is removed.
FIG. 13B is a diagram illustrating an example of restriction information that is set in accordance with the IF card illustrated in FIG. 13A.

FIG. 13A is a diagram illustrating a configuration example of the IF card in a case where the IF card having the SW illustrated in FIG. 11A built therein is removed. FIG. 13B is a diagram illustrating an example of the restriction information that is set in accordance with the IF card illustrated in FIG. 13A. Since the IF card described with reference to FIGS. 7A and 8B is included in FIGS. 13A and 13B, the description thereof will not be repeated here.

For example, in the IF card illustrated in FIG. 13A, connectable ports for port "#5", "#6", "#7", "#8", "#9", "#10", "#11", or "#12" to which data is input are ports other than the input port. In such a case, the OSPF-TE control unit 107, as illustrated in FIG. 13B, in setting of the Rest Info, stores port "#5", F Bit "0", and ID "0x40" in association with one another. In addition, the OSPF-TE control unit 107 stores port "#6", F Bit "0", and ID "0x40" in association with one another. Furthermore, the OSPF-TE control unit 107 stores port "#7", F Bit "0", and ID "0x40" in association with one another. In addition, the OSPF-TE control unit 107 stores port "#8", F Bit "0", and ID "0x40" in association with one another. Furthermore, the OSPF-TE control unit 107 stores port "#9", F Bit "0", and ID "0x40" in association with one another. In addition, the OSPF-TE control unit 107 stores port "#10", F Bit "0", and ID "0x40" in association with one another. Furthermore, the OSPF-TE control unit 107 stores port "#11", F Bit "0", and ID "0x40" in association with one another. In addition, the OSPF-TE control unit 107 stores port "#12", F Bit "0", and ID "0x40" in association with one another. In conclusion, the OSPF-TE control unit 107 updates ID "0x20" of ports "#5" to "#8" with "0x40".

In other words, in the Rest Info illustrated in FIG. 13B, port "#5" is represented that there are a plurality of connectable ports, and the connectable ports are ports having ID "0x40". Similarly, port "#6" is represented that there are a plurality of connectable ports, and the connectable ports are ports having ID "0x40". Similarly, port "#7" is represented that there are a plurality of connectable ports, and the connectable ports are ports having ID "0x40". Similarly, port "#8" is represented that there are a plurality of connectable ports, and the connectable ports are ports having ID "0x40". Similarly, port "#9" is represented that there are a plurality of connectable ports, and the connectable ports are ports having ID "0x40". Similarly, port "#10" is represented that there are a plurality of connectable ports, and the connectable ports are ports having ID "0x40". Similarly, port "#11" is represented that there are a plurality of connectable ports, and the connectable ports are ports having ID "0x40". Similarly, port "#12" is represented that there are a plurality of connectable ports, and the connectable ports are ports having ID "0x40".

Referring back to FIG. 3, the OSPF-TE control unit 107, for example, receives a restriction setting made by a user through the network management terminal, the UI 105, and the card managing unit 106. Then, the OSPF-TE control unit 107 sets the ID information of the received port as the Rest Info and sets the F Bit to "1" in a case where the connection destination is fixed to one. At this time, in a case where there is any other port to which the same ID has been assigned, a change in the connectable ports occurs, and accordingly, the OSPF-TE control unit 107 sets the F Bit in accordance with the change, and re-advertises the changed topology information. On the other hand, in a case where there is no other port to which the same ID has been assigned, the OSPF-TE control unit 107 advertises the topology information in which a restriction is newly set.

In addition, the OSPF-TE control unit 107, for example, receives a restriction releasing setting made by a user through the network management terminal, the UI 105, and the card managing unit 106. Then, the OSPF-TE control unit 107 removes the Rest Info corresponding to the received port information. At this time, in a case where there is a port to which the same ID as the ID of the removed port has been assigned, there is a change in the connectable port, and accordingly, the OSPF-TE control unit 107 sets the F Bit in accordance with the change and re-advertises the changed topology information. On the other hand, in a case where there is no other port to which the same ID has been assigned, the OSPF-TE control unit 107 advertises the topology information from which the restriction is removed.

When a route calculation request, in which the start port and the end port are designated, is received from the network management terminal, for example, through the UI 105, the route calculating unit 109 calculates the route while referring to the topology DB 108 and notifies the RSVP-TE control unit 110 of a calculation result. In the route calculation performed by the route calculating unit 109, the F Bit included in the Rest Info may not be used. The route calculation will be described in detail later.

The RSVP-TE control unit 110 performs a signaling protocol operation from the start node to the end node as end-to-end based on the calculation result of a route, for example, notified from the route calculating unit 109. Accordingly, the RSVP-TE control unit 110 sets the IF, the switch, and the like in each communication apparatus for the communication of a main signal. In addition, the RSVP-TE control unit 110 stores a route used in signaling, information relating to the signaling, and the like in the non-volatile memory 111. The storing of the route used in the signaling and the information relating to the signaling in the non-volatile memory 111 is performed for the recovery at the time of restarting the communication apparatus 100. The non-volatile memory 111, for example, stores the route used in the signaling and the information relating to the signaling therein.

Route Calculation

Figure 14:
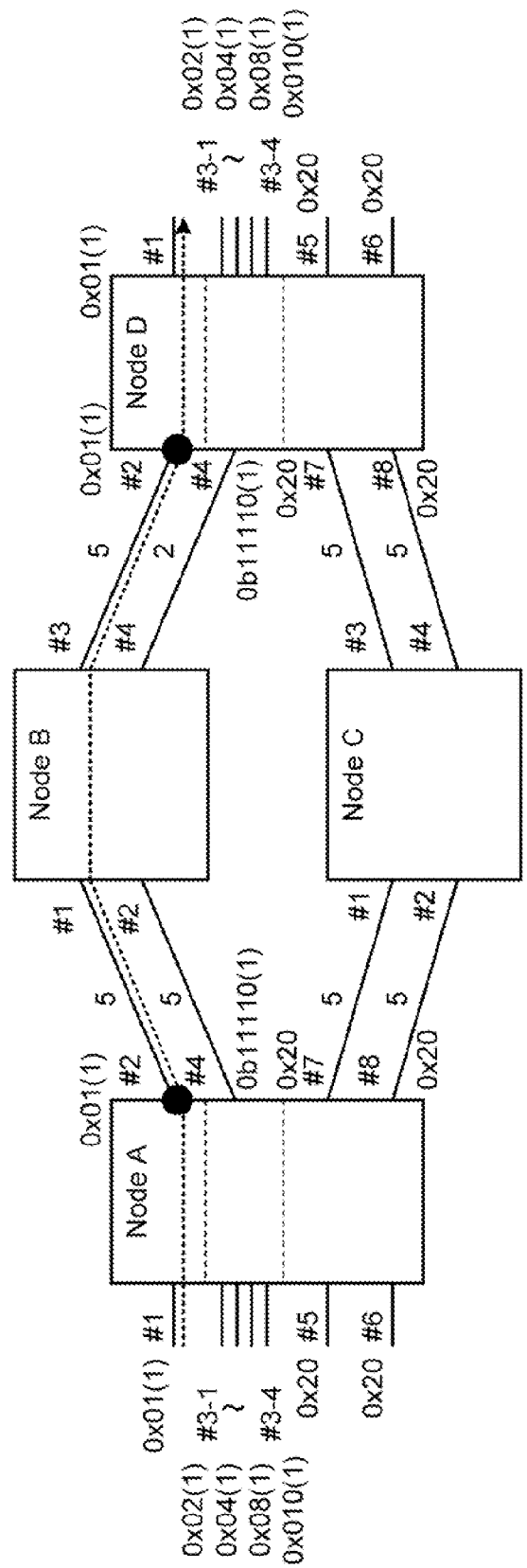
FIG. 14 is a diagram illustrating an example of route calculation in a case where the start and end ports have F Bits of "1"

Next, the calculation of a route using the Rest Info will be described with reference to FIGS. 14 to 18. FIG. 14 is a diagram illustrating an example of route calculation in a case where the start and end ports have F Bits of "1". Here, a value written near each port in FIG. 14 represents the Rest Info "ID (F Bit)" of the port. In addition, a value written in each route that connects ports of nodes represents a cost value. Here, ports "#1" and "#2" of Node A and Node D illustrated in FIG. 14 are assumed to be transponder cards. In addition, ports "#3-1" to "#3-4" and "#4" of Node A and Node D illustrated in FIG. 14 are assumed to be muxponder cards. FIG. 14 illustrates a case where, in a network including a communication apparatus from Node A to Node D, a request for calculating a route, of which the start point is port "#1" of Node A and the end point is port "#1" of Node D, is received by Node A.

For example, as illustrated in FIG. 14, Node A that has received the request for calculating a route from the network management terminal recognizes that an F Bit of "1" is assigned to port "#1" of Node A and port "#1" of Node D by referring to the topology DB 108. Then, Node A searches for a port to which the same ID as that of port "#1" of Node A is assigned within Node A and, as a result of the search, performs "Include designation" of port "#2" of Node A. In addition, Node A searches for a port to which the same ID as that of port "#1" of Node D is assigned within Node D and, as a result of the search, performs "Include designation" of port "#2" of Node D. In addition, the "Include designation" is denoted by a black circle in FIG. 14.

Subsequently, Node A recognizes that the connection destination node of port "#2" of Node A is Node B, and the port is port "#1" of Node B, by referring to the topology DB 108. In addition, Node A recognizes that the connection destination node of port "#2" of Node D is Node B, and the port is port "#3" of Node B, by referring to the topology DB 108. Here, since there is no restriction on ports "#1" and "#3" of Node B, Node A calculates a route of which the start point is port "#1 of Node B and the end point is port "#3" of Node B by excluding the ports of "Include designation". In other words, Node A outputs a result of calculation of a route in order of "ports "#1" and "#2" of Node A", "ports "#1" and "#3" of Node B", and "ports "#2" and "#1" of Node D". Here, the result of the route calculation is denoted by a dotted arrow in FIG. 14.

Figure 15:
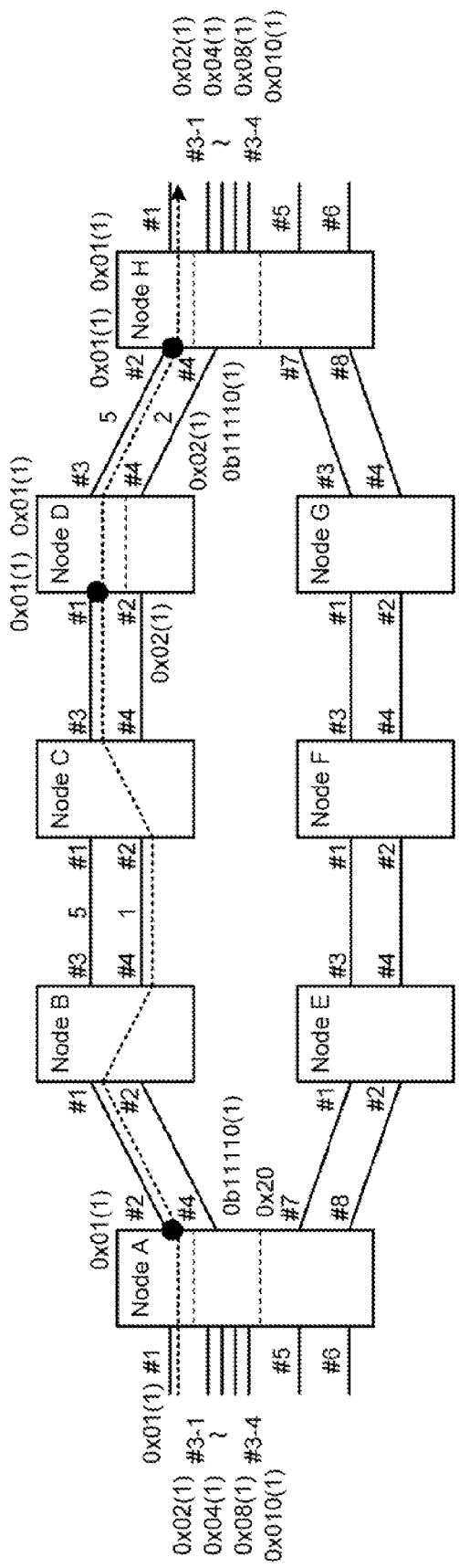
FIG. 15 is a diagram illustrating an example of route calculation in a case where ports of which the F Bits are "1" are continuous.

FIG. 15 is a diagram illustrating an example of route calculation in a case where ports having F Bits of "1" are continuous. Here, a value written near each port in FIG. 15 represents the Rest Info "ID (F Bit)" of the port. In addition, a value written in each route that connects ports of nodes represents a cost value. Here, ports "#1" and "#2" of Node A and Node H illustrated in FIG. 15 are assumed to be transponder cards. In addition, ports "#3-1" to "#3-4" and "#4" of Node A and Node H illustrated in FIG. 15 are assumed to be muxponder cards. Furthermore, ports "#1" and "#3" and ports "#2" and "#4" of Node D illustrated in FIG. 15 are cards that are physically different from each other, and a chassis housing a plurality of cards is assumed to be expanded. FIG. 15 illustrates a case where, in a network including a communication apparatus from Node A to Node H, a request for calculating a route, of which the start point is port "#1" of Node A and the end point is port "#1" of Node H, is received by Node A.

For example, as illustrated in FIG. 15, Node A that has received the request for calculating a route from the network management terminal recognizes that an F Bit of "1" is assigned to port "#1" of Node A and port "#1" of Node H by referring to the topology DB 108. Then, Node A searches for a port to which the same ID as that of port "#1" of Node A is assigned within Node A and, as a result of the search, performs "Include designation" of port "#2" of Node A. In addition, Node A searches for a port to which the same ID as that of port "#1" of Node H is assigned within Node H and, as a result of the search, performs "Include designation" of port "#2" of Node H. Subsequently, Node A recognizes that the connection destination node of port "#2" of Node H is Node D, the port is port "#3" of Node D, and an F Bit of "1" is assigned thereto by referring to the topology DB 108. Thereafter, Node A searches for a port to which the same ID as that of port "#3" of Node D is assigned within Node D and, as a result of the search, performs "Include designation" of port "#1" of Node D. In addition, the "Include designation" is denoted by a black circle in FIG. 15.

Then, Node A recognizes that the connection destination node of port "#1" of Node D is Node C, and the port is port "#3" of Node C, by referring to the topology DB 108. Here, since there is no restriction on port "#3" of Node C and port "#1" of Node B, Node A calculates a route of which the start point is port "#1 of Node B and the end point is port "#3" of Node C by excluding the ports of "Include designation". Node A selects a route having a smaller cost value in the route calculation from port "#1" of Node B to port "#3" of Node C in which there is no restriction. In other words, Node A outputs a result of calculation of a route in order of "ports "#1" and "#2" of Node A", "ports "#1" and "#4" of Node B", "ports "#2" and "#3" of Node C", "ports "#1" and "#3" of Node D", and "ports "#2" and "#1" of Node H". Here, the result of the route calculation is denoted by a dotted arrow in FIG. 15.

Figure 16:
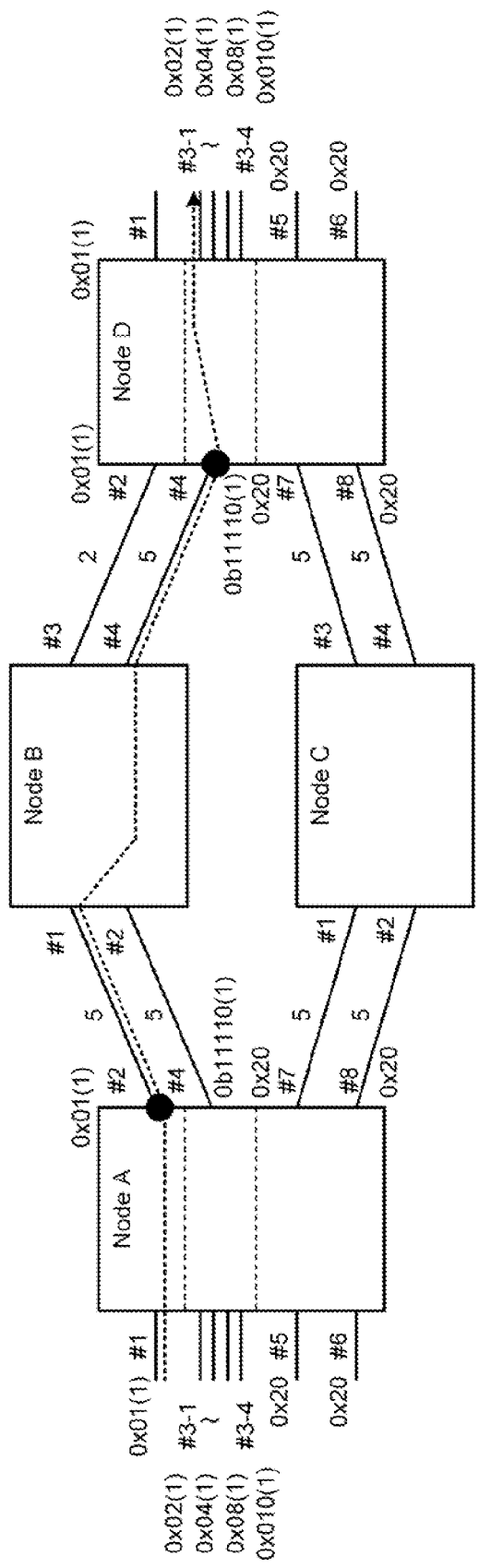
FIG. 16 is a diagram illustrating an example of route calculation in a case where a muxponder card is an end point.

FIG. 16 is a diagram illustrating an example of route calculation in a case where a muxponder card is an end point. Here, a value written near each port in FIG. 16 represents the Rest Info "ID (F Bit)" of the port. In addition, a value written in each route that connects ports of nodes represents a cost value. Here, ports "#1" and "#2" of Node A and Node D illustrated in FIG. 16 are assumed to be transponder cards. In addition, ports "#3-1" to "#3-4" and "#4" of Node A and Node D illustrated in FIG. 16 are assumed to be muxponder cards. FIG. 16 illustrates a case where, in a network including a communication apparatus from Node A to Node D, a request for calculating a route, of which the start point is port "#1" of Node A and the end point is port "#3-1" of Node D, is received by Node A.

For example, as illustrated in FIG. 16, Node A that has received the request for calculating a route from the network management terminal recognizes that an F Bit of "1" is assigned to port "#1" of Node A and port "#3-1" of Node D by referring to the topology DB 108. Then, Node A searches for a port to which the same ID as that of port "#1" of Node A is assigned within Node A and, as a result of the search, performs "Include designation" of port "#2" of Node A. In addition, Node A searches for port "#4" to which the same ID as that of port "#3-1" of Node D is connectable in Node D and, as a result of the search, performs "Include designation" of port "#4" of Node D. In addition, the "Include designation" is denoted by a black circle in FIG. 16.

Subsequently, Node A recognizes that the connection destination node of port "#1" of Node A is Node B, and the port is port "#1" of Node B, by referring to the topology DB 108. In addition, Node A recognizes that the connection destination node of port "#4" of Node D is Node B, and the port is port "#4" of Node B, by referring to the topology DB 108. Here, since there is no restriction on ports "#1" and "#4" of Node B, Node A calculates a route of which the start point is port "#1 of Node B and the end point is port "#4" of Node B by excluding the ports of "Include designation". In other words, Node A outputs a result of calculation of a route in order of "ports "#1" and "#2" of Node A", "ports "#1" and "#4" of Node B", and "ports "#4" and "#3-1" of Node D". Here, the result of the route calculation is denoted by a dotted arrow in FIG. 16.

Figure 17:
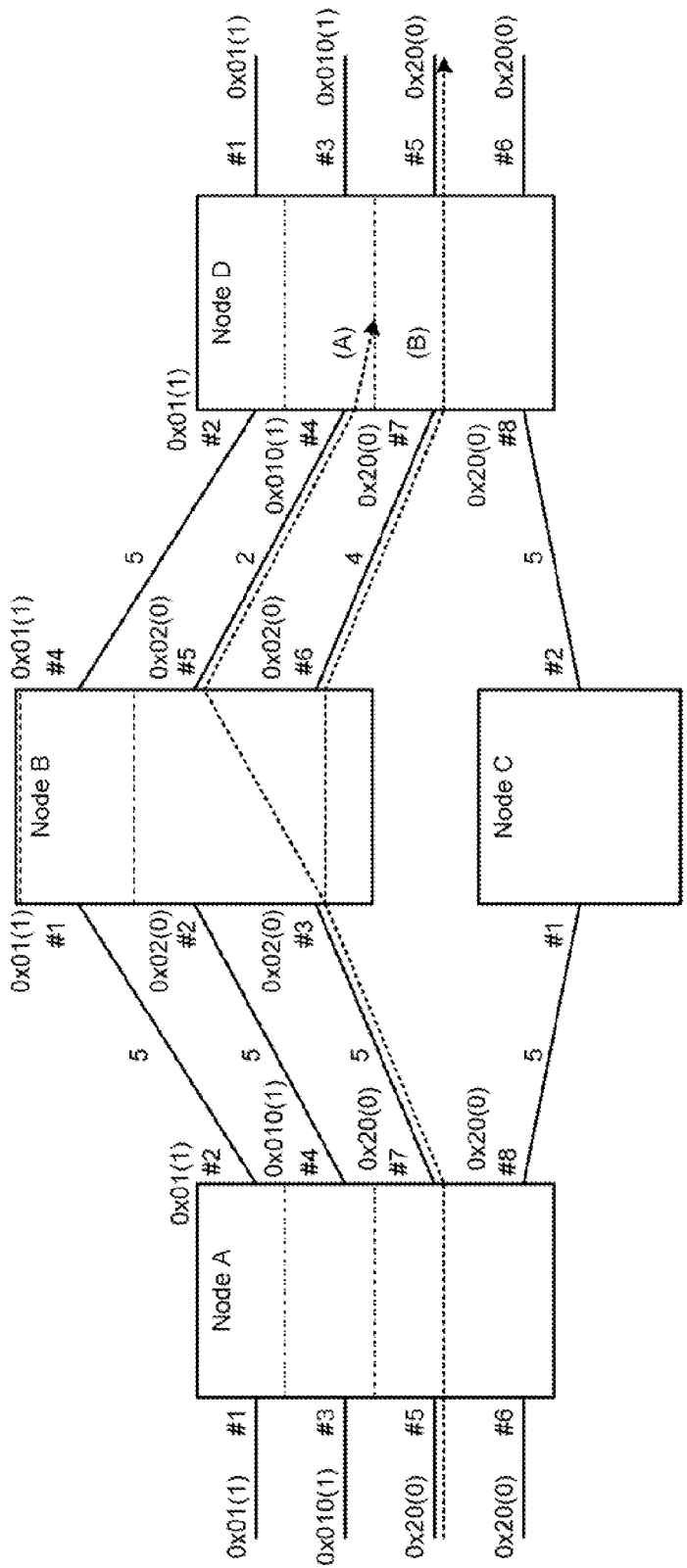
FIG. 17 is a diagram illustrating an example of route calculation in a case where an F Bit is not used.

FIG. 17 is a diagram illustrating an example of route calculation in a case where an F Bit is not used. Here, a value written near each port in FIG. 17 represents the Rest Info "ID (F Bit)" of the port. In the description presented with reference to FIG. 17, calculation of a route not using an F Bit will be described. In addition, a value written in each route that connects ports of nodes represents a cost value. Here, ports "#3" and "#4" of Node A and Node D illustrated in FIG. 17 are assumed to be transponder cards. Similarly, ports "#1" and "#4" of Node B illustrated in FIG. 17 are assumed to be transponder cards. FIG. 17 illustrates a case where, in a network including a communication apparatus from Node A to Node D, a request for calculating a route, of which the start point is port "#5" of Node A and the end point is port "#5" of Node D, is received by Node A.

For example, as illustrated in FIG. 17, Node A acquires ports "#6", "#7", and "#8" that can be connected to port "#5" of Node A by referring to the topology DB 108. Here, it is assumed that Node A selects port "#7" out of ports "#7" and "#8" of Node A that have the same cost value. Then, Node A recognizes that the connection destination node of port "#7" of Node A is Node B, and the port is port "#3" of Node B, by referring to the topology DB 108.

Subsequently, Node A acquires ports "#5" and "#6" that can be connected to port "#3" of Node B by referring to the topology DB 108. Here, Node A selects port "#5" of Node B having a smaller cost value out of ports "#5" and "#6" of Node B. Thereafter, Node A recognizes that the connection destination node of port "#5" of Node B is Node D, and the port is port "#4" of Node D, by referring to the topology DB 108.

Then, since port "#5" as the end point is present in Node D, Node A determines whether or not ports "#4" and "#5" of Node D can be connected to each other by referring to the topology DB 108. At this time, since the IDs of ports "#4" and "#5" of Node D are different from each other, Node A recognizes that a route (A) illustrated in FIG. 17 is not connectable.

Thus, Node A recalculates from port "#3" of Node B that is acquired by returning backward by one hop. In the recalculation, Node A selects port "#6" that can be connected to port "#3" of Node B. Then, Node A recognizes that the connection destination node of port "#6" of Node B is Node D, and the port is port "#7" of Node D by referring to the topology DB 108.

Subsequently, since port "#5" as the end point is present in Node D, Node A determines whether or not ports "#7" and "#5" of Node D can be connected to each other by referring to the topology DB 108. At this time, since the IDs of ports "#7" and "#5" of Node D are the same, Node A outputs a route (B) illustrated in FIG. 17 as a calculation result. In other words, Node A outputs the calculation result of a route in order of "ports "#5" and "#7" of Node A", "ports "#3" and "#6" of Node B", and "ports "#7" and "#5" of Node D".

Figure 18:
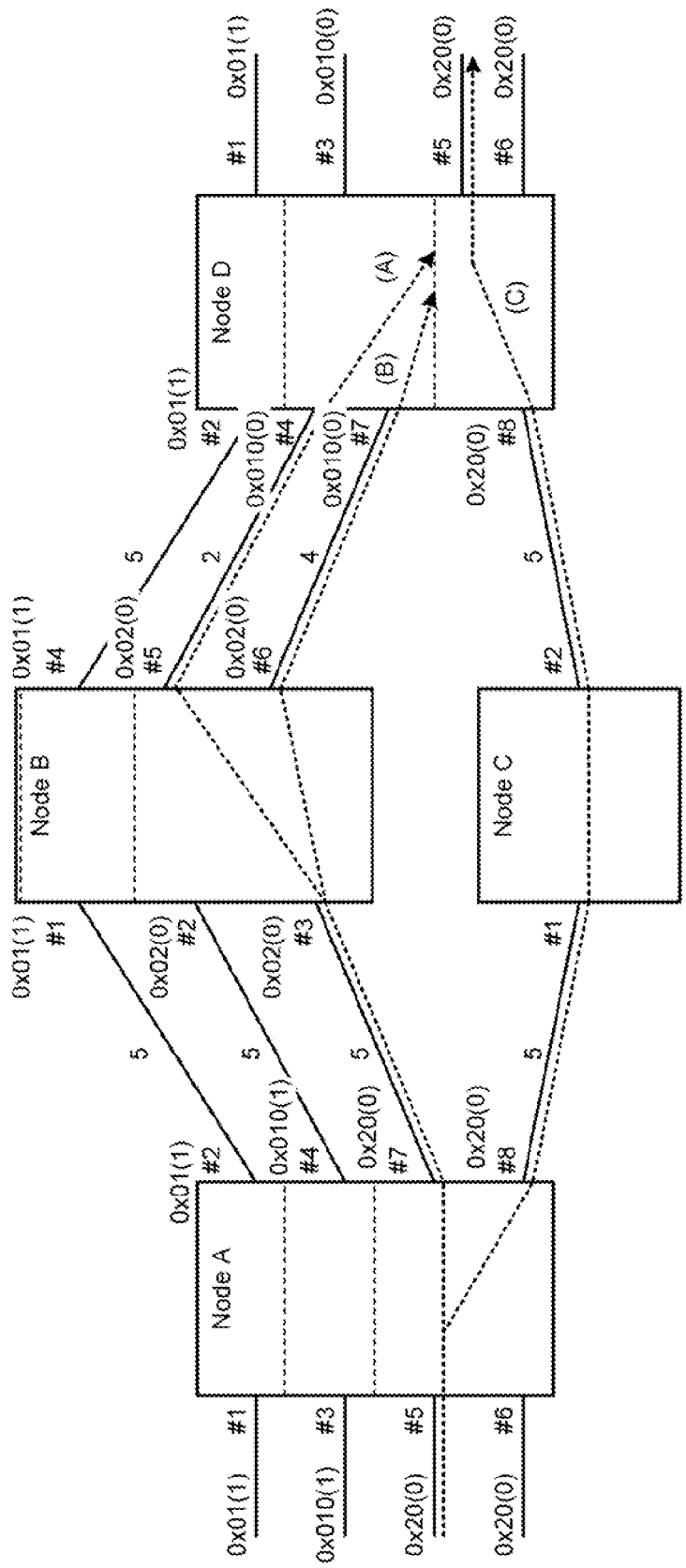
FIG. 18 is a diagram illustrating an example of route calculation in a case where an F Bit is not used.

FIG. 18 is a diagram illustrating an example of route calculation in a case where an F Bit is not used. Here, a value written near each port in FIG. 18 represents the Rest Info "ID (F Bit)" of the port. In the description presented with reference to FIG. 18, calculation of a route not using an F Bit will be described. In addition, a value written in each route that connects ports of nodes represents a cost value. Here, ports "#3" and "#4" of Node A illustrated in FIG. 18 are assumed to be transponder cards. Similarly, ports "#1" and "#4" of Node B illustrated in FIG. 18 are assumed to be transponder cards. In addition, ports "#3", "#4", and "#7" of Node D illustrated in FIG. 18 are assumed to be IF cards in which a SW is built, IF cards that pass through a SW card, or the like. FIG. 18 illustrates a case where, in a network including a communication apparatus from Node A to Node D, a request for calculating a route, of which the start point is port "#5" of Node A and the end point is port "#5" of Node D, is received by Node A.

For example, as illustrated in FIG. 18, Node A acquires ports "#6", "#7", and "#8" that can be connected to port "#5" of Node A by referring to the topology DB 108. Here, it is assumed that Node A selects port "#7" out of ports "#7" and "#8" of Node A that have the same cost value. Then, Node A recognizes that the connection destination node of port "#7" of Node A is Node B, and the port is port "#3" of Node B, by referring to the topology DB 108.

Subsequently, Node A acquires ports "#5" and "#6" that can be connected to port "#3" of Node B by referring to the topology DB 108. Here, Node A selects port "#5" of Node B having a smaller cost value out of ports "#5" and "#6" of Node B. Thereafter, Node A recognizes that the connection destination node of port "#5" of Node B is Node D, and the port is port "#4" of Node D, by referring to the topology DB 108.

Then, since port "#5" as the end point is present in Node D, Node A determines whether or not ports "#4" and "#5" of Node D can be connected to each other by referring to the topology DB 108. At this time, since the IDs of ports "#4" and "#5" of Node D are different from each other, Node A recognizes that a route (A) illustrated in FIG. 18 is not connectable.

Thus, Node A recalculates from port "#3" of Node B that is acquired by returning backward by one hop. In the recalculation, Node A selects port "#6" that can be connected to port "#3" of Node B. Then, Node A recognizes that the connection destination node of port "#6" of Node B is Node D, and the port is port "#7" of Node D by referring to the topology DB 108.

Subsequently, since port "#5" as the end point is present in Node D, Node A determines whether or not ports "#7" and "#5" of Node D can be connected to each other by referring to the topology DB 108. At this time, since the IDs of ports "#7" and "#5" of Node D are different from each other, Node A recognizes that a route (B) illustrated in FIG. 18 is not connectable.

Thus, Node A recalculates from port "#5" of Node A that is acquired by returning backward by one hop further. In the recalculation, Node A selects port "#8" that can be connected to port "#5" of Node A. Then, Node A recognizes that the connection destination node of port "#8" of Node A is Node C, and the port is port "#1" of Node C by referring to the topology DB 108.

Subsequently, Node A selects port "#2" that can be connected to port "#1" of Node C. Thereafter, Node A recognizes that the connection destination node of port "#2" of Node C is Node D, and the port is port "#8" of Node D by referring to the topology DB 108.

Then, since port "#5" as the end point is present in Node D, Node A determines whether or not ports "#8" and "#5" of Node D can be connected to each other by referring to the topology DB 108. At this time, since the IDs of ports "#8" and "#5" of Node D are the same, Node A outputs a route (C) illustrated in FIG. 18 as a calculation result. In other words, Node A outputs the calculation result of a route in order of "ports "#5" and "#8" of Node A", "ports "#1" and "#2" of Node C", and "ports "#8" and "#5" of Node D".

Topology Information Setting Process

Figure 19:
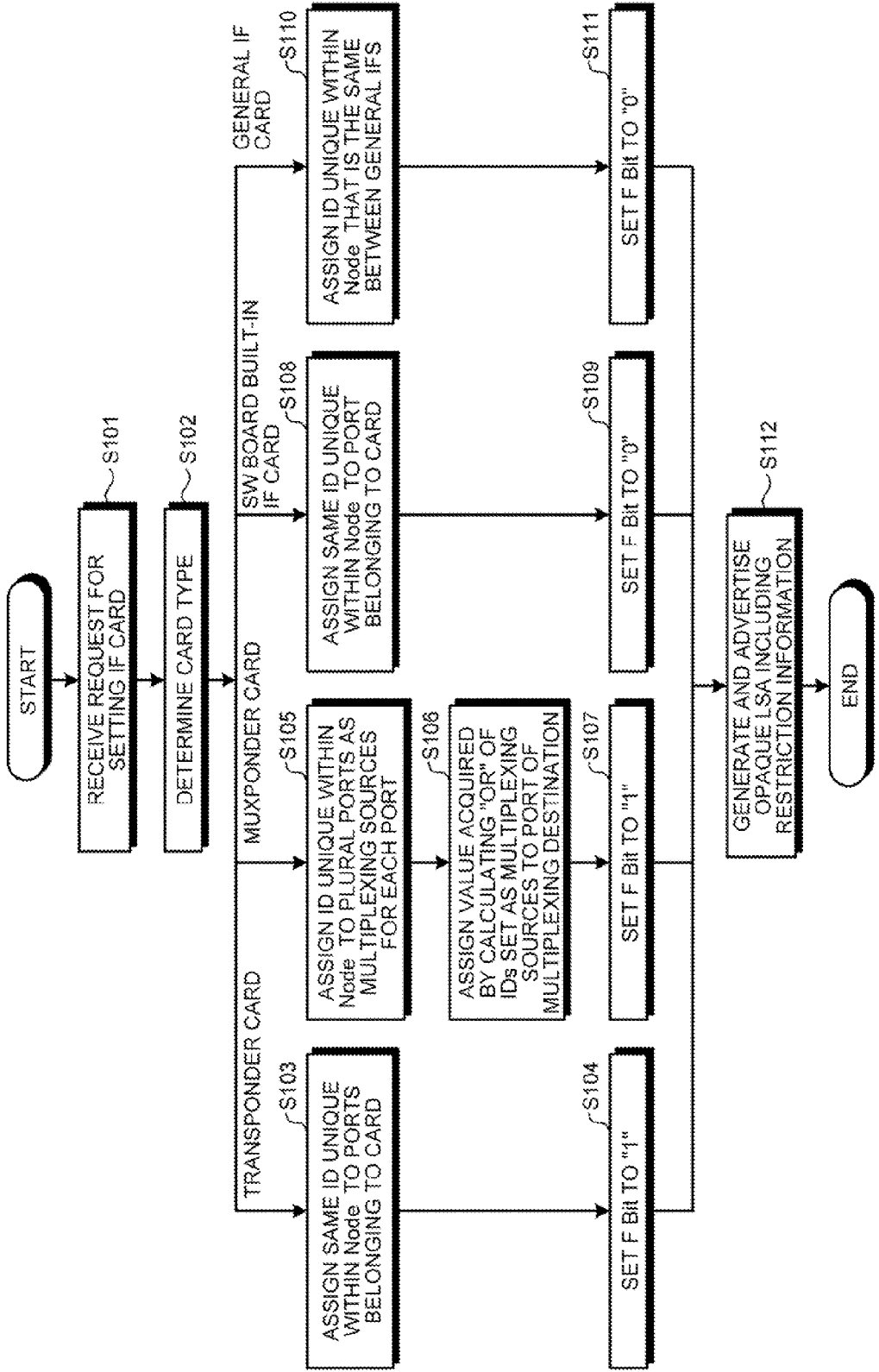
FIG. 19 is a flowchart illustrating an example of the flow of a topology information setting process at the time of setting the IF card according to the first embodiment.

Next, a topology information setting process at the time of setting an IF card according to the first embodiment will be described with reference to FIG. 19. FIG. 19 is a flowchart illustrating an example of the flow of the topology information setting process at the time of setting the IF card according to the first embodiment.

For example, as illustrated in FIG. 19, the communication apparatus 100 receives a request for setting an IF card from the network management terminal in Step S101. Then, the communication apparatus 100 determines the card type of the IF card included in the communication apparatus 100 in Step S102. At this time, in a case where the card type is a transponder card, the communication apparatus 100 assigns the same ID that is unique inside the communication apparatus 100 to each port included in the transponder card in Step S103. Thereafter, the communication apparatus 100 sets "1" to the F Bit in Step S104.

On the other hand, in a case where the card type is a muxponder card, the communication apparatus 100 assigns IDs that are unique inside the communication apparatus 100 to a plurality of ports as multiplexing sources of the muxponder card in Step S105. Then, the communication apparatus 100 assigns a value acquired by calculating OR of IDs set as the multiplexing sources to the port as the multiplexing destination of the muxponder card in Step S106. Thereafter, the communication apparatus 100 sets "1" to the F Bit in Step S107.

In addition, in a case where the card type is an IF card in which a SW board is built, the communication apparatus 100 assigns the same ID that is unique inside the communication apparatus 100 to each port included in the IF card in Step S108. Thereafter, the communication apparatus 100 sets "0" to the F Bit in Step S109.

On the other hand, in a case where the card type is a general IF card, the communication apparatus 100 assigns an ID that is the same for the IF cards and is unique inside the communication apparatus 100 in Step S110. Then, the communication apparatus 100 sets "0" to the F Bit in Step S111. Thereafter, the communication apparatus 100 generates an Opaque LSA including Rest Info in which the F Bit and the ID are set and advertises the generated Opaque LSA to adjacent communication apparatuses in Step S112.

Figure 20:
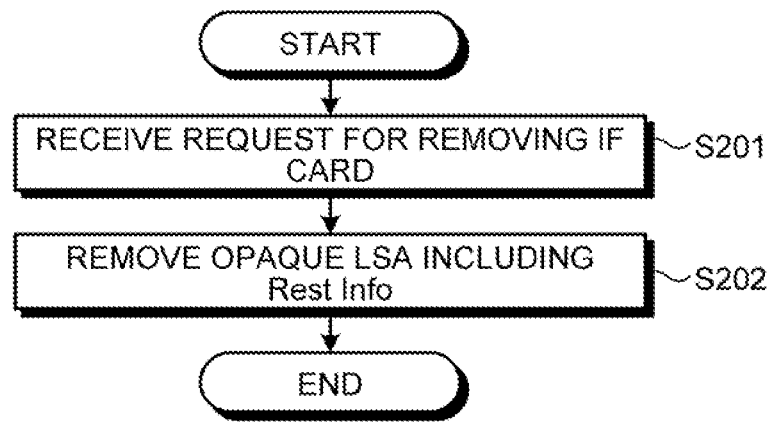
FIG. 20 is a flowchart illustrating an example of the flow of a topology information setting process at the time of removing an IF card according to the first embodiment.

Next, a topology information setting process at the time of removing an IF card according to the first embodiment will be described with reference to FIG. 20. FIG. 20 is a flowchart illustrating an example of the flow of the topology information setting process at the time of removing an IF card according to the first embodiment.

For example, as illustrated in FIG. 20, the communication apparatus 100 receives a request for removing an IF card from the network management terminal in Step S201. Then, the communication apparatus 100 removes the Opaque LSA including the Rest Info of the corresponding IF card and changes the Rest Info of other IF cards that occur due to the removal in Step S202. In addition, the communication apparatus 100 advertises the Opaque LSA including the Rest Info after the update to adjacent communication apparatuses.

Figure 21:
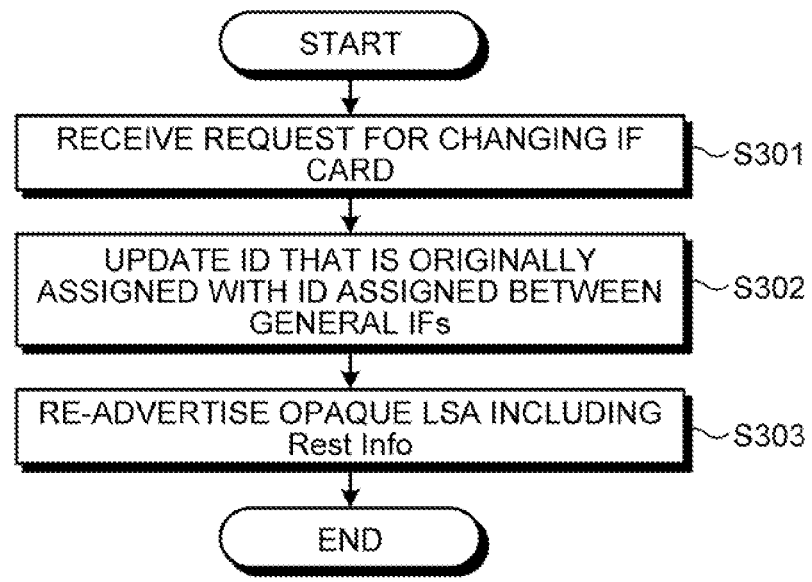
FIG. 21 is a flowchart illustrating an example of the flow of a topology information setting process at the time of changing an IF card according to the first embodiment.

Next, a topology information setting process at the time of changing an IF card according to the first embodiment will be described with reference to FIG. 21. FIG. 21 is a flowchart illustrating an example of the flow of the topology information setting process at the time of changing an IF card according to the first embodiment. FIG. 21 illustrates a process in a case where a restriction that is originally included in an IF card is released due to the revision of hardware or the like.

For example, as illustrated in FIG. 21, the communication apparatus 100 receives a request for changing an IF card from the network management terminal in Step S301. Then, the communication apparatus 100 updates the ID of the IF card with an ID that is assigned to a general IF card in Step S302. Subsequently, the communication apparatus 100 re-advertises the Opaque LSA including the Rest Info to the adjacent communication apparatuses in Step S303.

Figure 22:
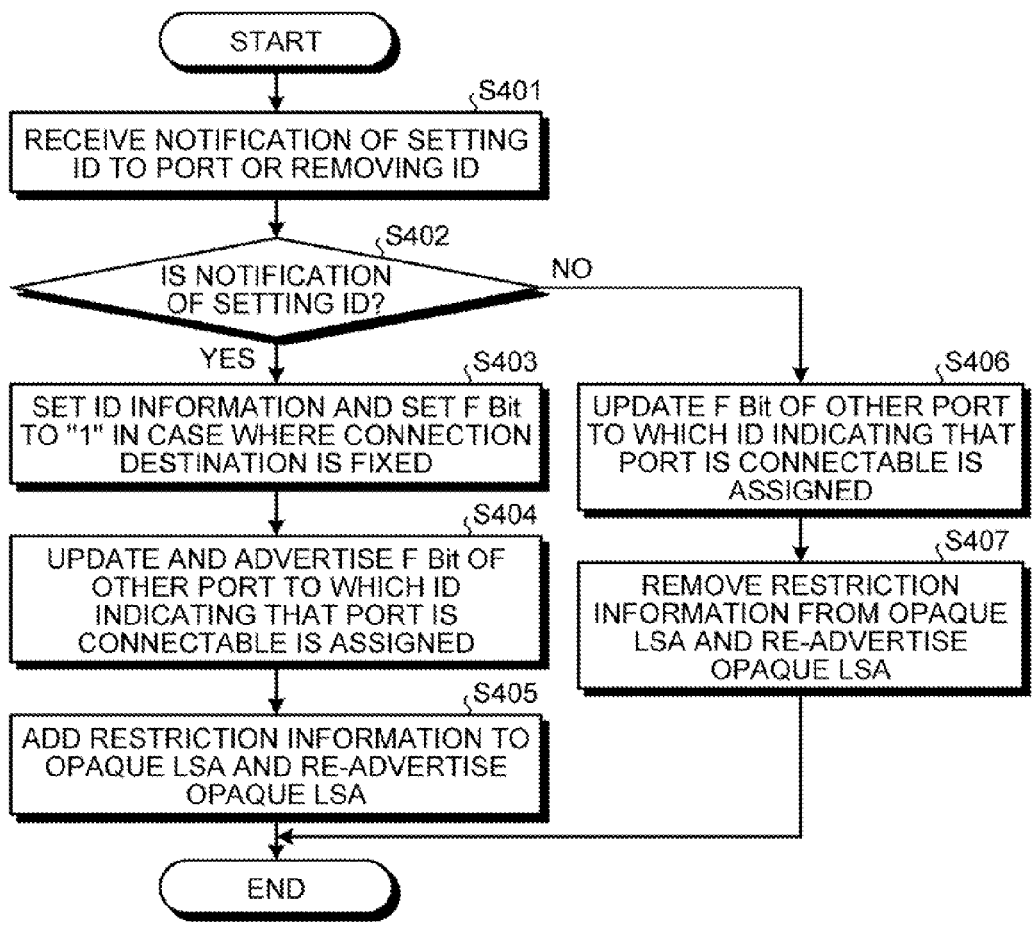
FIG. 22 is a flowchart illustrating an example of the flow of a topology information setting process at the time of changing a restriction according to the first embodiment.

Next, a topology information setting process at the time of changing a restriction according to the first embodiment will be described with reference to FIG. 22. FIG. 22 is a flowchart illustrating an example of the flow of the topology information setting process at the time of changing a restriction according to the first embodiment. FIG. 22 illustrates a case where an intended restriction of a port is set or removed by a user.

For example, as illustrated in FIG. 22, the communication apparatus 100 receives a notification for setting or removing an ID of a port from the network management terminal in Step S401. Then, the communication apparatus 100 determines whether or not the received notification is a notification used for setting an ID in Step S402. At this time, in a case where the received notification is the notification used for setting an ID (Yes in Step S402), the communication apparatus 100 sets the ID information to a target port and sets "1" to the F Bit in a case where a connectable port is fixed in Step S403.

In addition, when there are a plurality of connectable ports in a case where the port having the same ID is already present, the communication apparatus 100 sets the F Bit to "0" in a case where there is a plurality of connectable ports and sets the F Bit to "1" in a case where the connectable port is fixed to one and advertises the changed Opaque LSA in Step S404. In addition, the communication apparatus 100 re-advertises the Opaque LSA to which the Rest Info of the port of which the ID has been newly set in Step S405.

On the other hand, when there is any other port to which the same ID is assigned in a case where the received notification is a notification used for removing an ID (No in Step S402), the communication apparatus 100 updates the F Bit of the other port in accordance with the connection state in Step S406. In other words, the communication apparatus 100 updates the F Bit to "0" in a case where there are a plurality of connectable ports and updates the F Bit to "1" in a case where the connectable port is fixed to one and re-advertises the Opaque LSA in a case where there is a change in the F Bit. In addition, the communication apparatus 100 re-advertises the Opaque LSA from which the Rest Info of the port, of which the ID has been removed, is removed in Step S407.

Route Calculating Process

Figure 23:
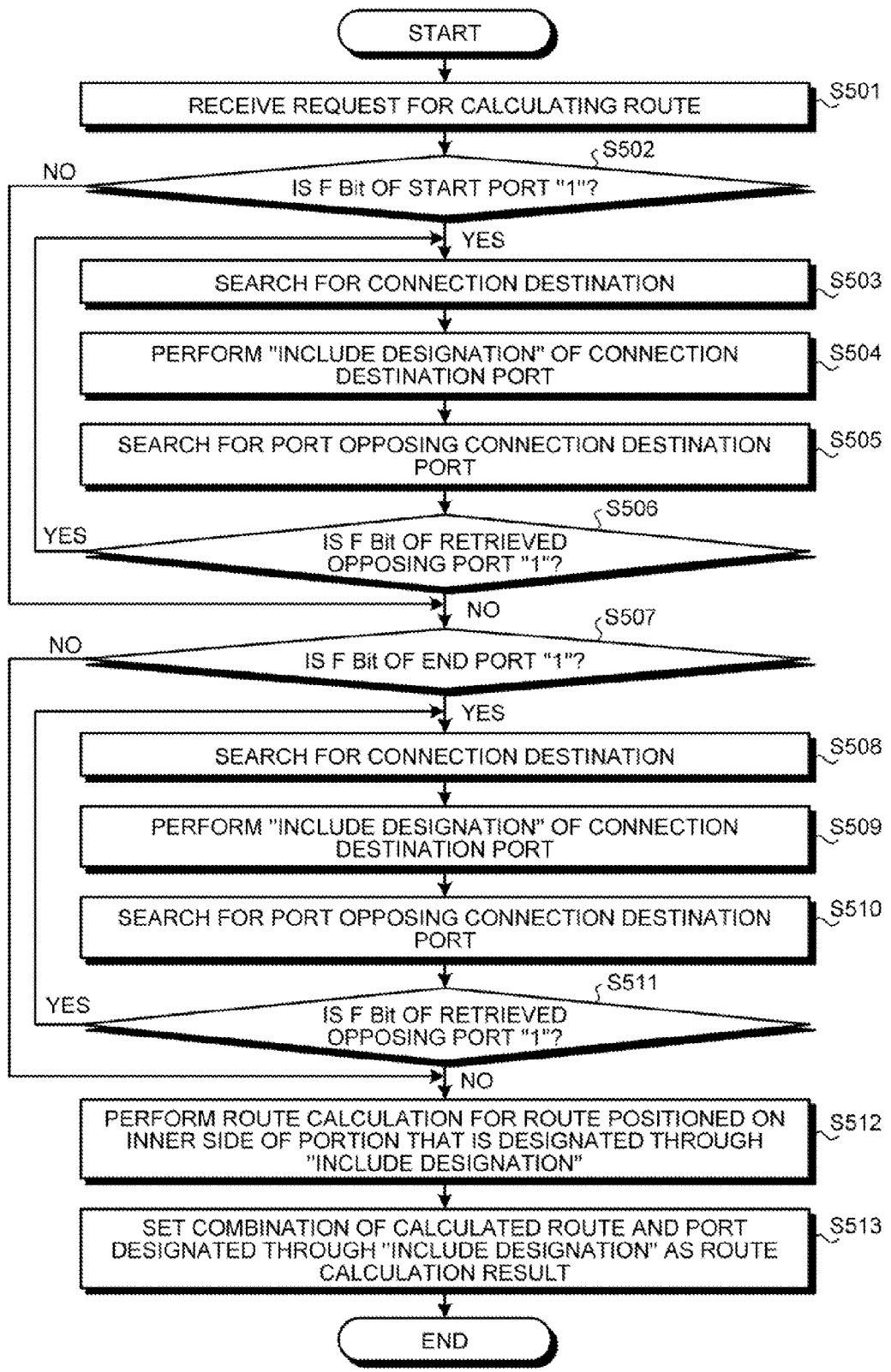
FIG. 23 is a flowchart illustrating an example of the flow of a process of reflecting the restriction item according to the first embodiment on the route calculation.

Next, a process of reflecting the restriction item according to the first embodiment on route calculation will be described with reference to FIG. 23. FIG. 23 is a flowchart illustrating an example of the flow of the process of reflecting the restriction item according to the first embodiment on the route calculation.

For example, as illustrated in FIG. 23, the communication apparatus 100 receives a route calculating request from the network management terminal in Step S501. In the route calculating request, information of designated start and end ports and the like is included. Then, the communication apparatus 100 determines whether or not the F Bit of the designated start port is "1" by referring to the topology DB 108 in Step S502. At this time, in a case where the F Bit of the start port is "1" (Yes in Step S502), the communication apparatus 100 searches for a port that can be connected to the start port in Step S503. Then, the communication apparatus 100 performs "Include designation" of the retrieved port in Step S504. Subsequently, the communication apparatus 100 searches for a port of the communication apparatus that opposes the retrieved port by referring to the topology DB 108 in Step S505. Thereafter, the communication apparatus 100 determines whether or not the F Bit of the opposing port of the communication apparatus is "1" in Step S506. At this time, in a case where the F Bit is "1" (Yes in Step S506), the communication apparatus 100 performs the process of S503 in which a connectable port is further searched.

On the other hand, in a case where the F Bit is "0" (No in Step S506), the communication apparatus 100 determines whether the F Bit of the designated end port is "1" by referring to the topology DB 108 in Step S507. At this time, in a case where the F Bit of the end port is "1" (Yes in Step S507), the communication apparatus 100 searches for a port that can be connected to the end port in Step S508. Then, the communication apparatus 100 performs "Include designation" of the retrieved port in Step S509. Subsequently, the communication apparatus 100 searches for a port of the communication apparatus that opposes the retrieved port by referring to the topology DB 108 in Step S510. Thereafter, the communication apparatus 100 determines whether or not the F Bit of the opposing port of the communication apparatus is "1" in Step S511. At this time, in a case where the F Bit is "1" (Yes in Step S511), the communication apparatus 100 performs the process of Step S508 in which a connectable port is further searched.

On the other hand, in a case where the F Bit is "0" (No in Step S511), the communication apparatus 100 performs route calculation for a route that is positioned on the inner side of a portion that has been designated through "Include designation" in Step S512. Then, the communication apparatus 100 outputs a route acquired by combining the route for which the route calculation has been performed and the port that has been designated through "Include designation" as a result of the route calculation in Step S513. In addition, in a case where the F Bit of the start port is "0" (No in Step S502), the communication apparatus 100 performs the process of Step S507. In addition, in a case where the F Bit of the end port is "0" (No in Step S507), the communication apparatus 100 performs the process of Step S512. Furthermore, in a case where the F Bits of the start and end ports are "0" or the Rest Info has not been assigned, the communication apparatus 100 does not perform "Include designation".

Figure 24:
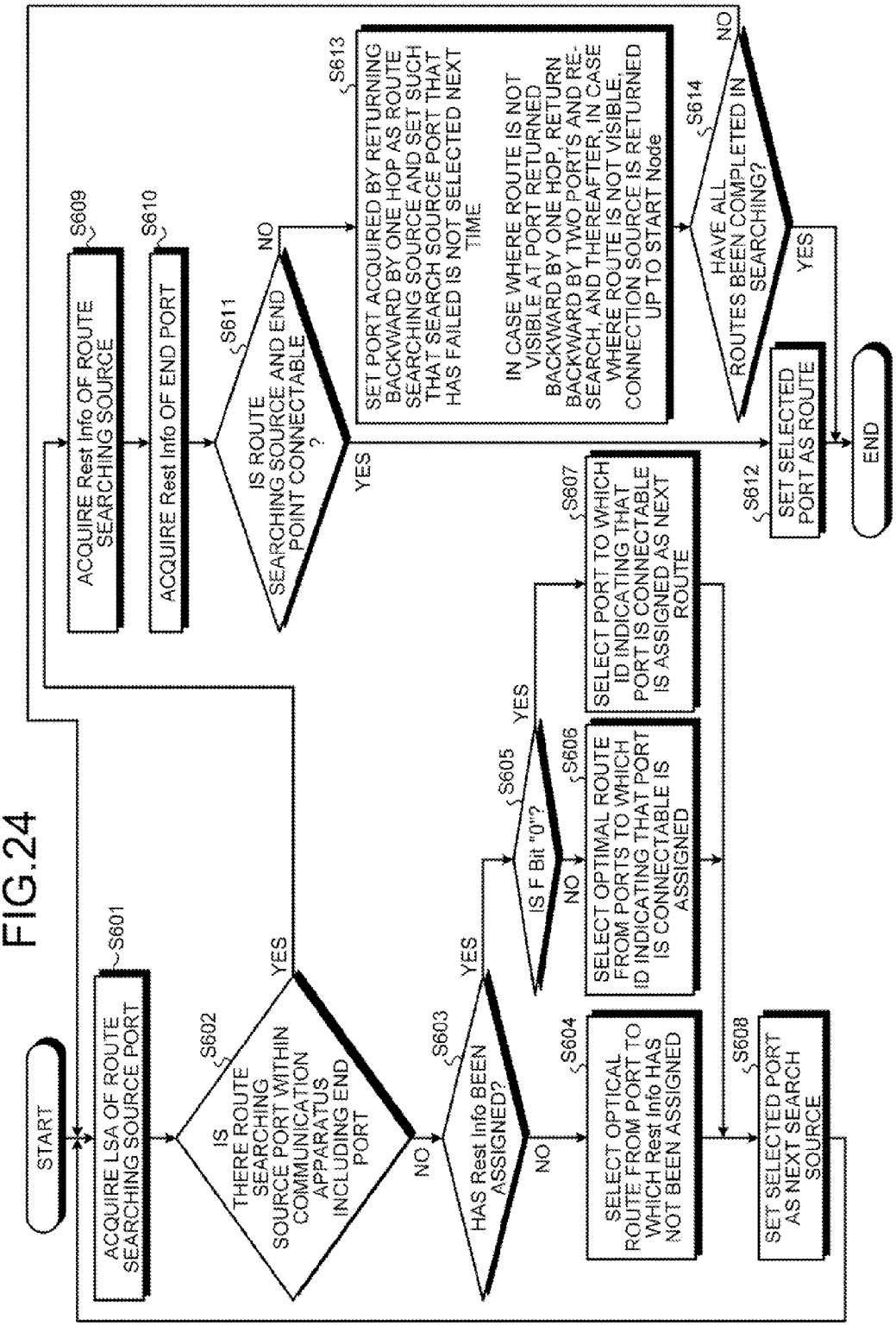
FIG. 24 is a flowchart illustrating an example of the flow of a route calculating process according to the first embodiment.
Figure 25A:
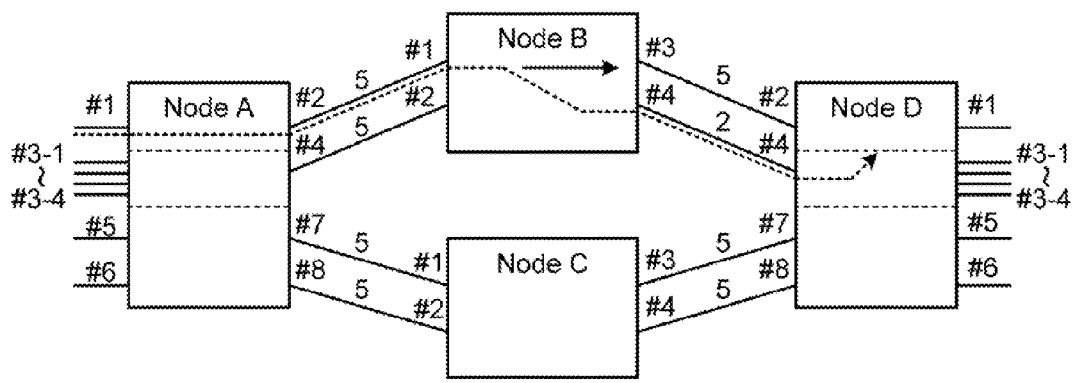
FIG. 25A is a diagram illustrating a conventional problem in a case where there is a restriction of a connection destination.
Figure 25B:
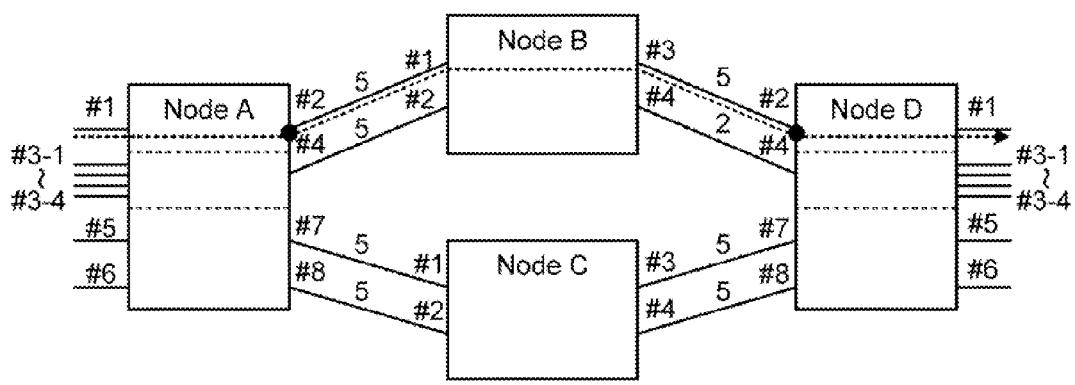
FIG. 25B is a diagram illustrating an example of setting information used for selecting a route passing through a specific port.

Next, a route calculating process according to the first embodiment will be described with reference to FIG. 24. FIG. 24 is a flowchart illustrating an example of the route calculating process according to the first embodiment.

For example, as illustrated in FIG. 24, in a case where the route calculation is performed, the communication apparatus 100 acquires the Opaque LSA of a port as a route searching source from the topology DB 108 in Step S601. Then, the communication apparatus 100 determines whether or not the port as the route searching source is a port located inside the communication apparatus including the end port in Step S602. At this time, in a case where the port is determined not to be a port inside the communication apparatus including the end port (No in Step S602), the communication apparatus 100 determines whether or not Rest Info has been assigned to the port as the route searching source inside the Opaque LSA in Step S603.

In a case where the Rest Info has not been assigned to the port as the route searching source (No in Step S603), there is no restriction on the connection destination, and accordingly, the communication apparatus 100 selects an optical route from the port to which the Rest Info has not been assigned in Step S604. Here, for example, the optical route is a route having the smallest cost value. On the other hand, in a case where the Rest Info has been assigned to the port as the route searching source (Yes in Step S603), the communication apparatus 100 determines whether or not the F Bit is "1" in Step S605.

At this time, in a case where the F Bit is "0" (No in Step S605), the communication apparatus 100 selects an optimal route from among ports having connectable IDs in Step S606. On the other hand, in a case where the F Bit is "1" (Yes in Step S605), the communication apparatus 100 selects a port having a connectable ID as the next route in Step S607. Then, the communication apparatus 100 sets the selected port as the route searching source in Step S608 and performs the process of Step S601 again.

On the other hand, in a case where the port is determined as a port located inside the communication apparatus including the end port (Yes in Step S602) in Step S602, the communication apparatus 100 acquires the Rest Info of the route searching source in Step S609. In addition, the communication apparatus 100 further acquires the Rest Info of the end port in Step S610. Then, the communication apparatus 100 determines whether or not the port as the route searching source and the end port can be connected to each other in Step S611.

At this time, in a case where the port as the route searching source and the end port can be connected to each other (Yes in Step S611), the communication apparatus 100 outputs the ports that have been selected until then as a calculation result in Step S612. On the other hand, in a case where the port as the route searching source and the end port are not connectable (No in Step S611), the communication apparatus 100 performs the process of Step S613. In the process of Step S613, the communication apparatus 100 sets a port acquired by returning backward by one hop as the route searching source and sets the port that has not been selected as the route not to be selected next time. In addition, in the process of Step S613, in a case where a route is not selected at the port acquired by returning backward by one hop, the communication apparatus 100 performs a process of returning the route searching source backward by one hop and re-searching for a route and returns the route searching source up to the port of the start node in a case where the route is not selected. Then, the communication apparatus 100 determines whether or not the search has been completed for all the routes in Step S614. At this time, in a case where the search has been completed for all the routes (Yes in Step S614), there is no selectable route for the route from the start port to the end port that are designated, and accordingly, the communication apparatus 100 outputs an error and ends the process. On the other hand, in a case where the search has not been completed for all the routes (No in Step S614), the communication apparatus 100 performs the process of Step S601.

Advantages of First Embodiment

As described above, even in a case where there is a restriction on the route calculation, the communication apparatus 100 selects a route to which the restriction is applied, and accordingly, compared to a conventional technique that causes an error without performing route calculation to which the restriction is applied, a route relating to data transmission can be accurately selected. In addition, since the communication apparatus 100 autonomously performs the route calculation in a case where the start and end ports are designated, the operation of the GMPLS in a network including a plurality of communication apparatuses can be performed without allowing a user such as a maintenance staff to recognize the restriction relating to the data transmission. In addition, in the route calculation, the communication apparatus 100 determines a route that is necessarily to be passed through and sets the route that is necessarily to be passed through to be excluded from a target of the route calculation, whereby the calculation amount can be decreased, and the processing load can be reduced.

[b] Second Embodiment

Until now, although an embodiment of the communication apparatus 100 disclosed here has been described, an embodiment other than the above-described embodiment may be employed. Thus, another embodiment having a "configuration" different from that of the above-described embodiment will be described.

Configuration

The processing sequences, the control sequences, specific names, and information including various types of data or parameters (for example, information stored in the topology DB 108 or the like) presented in the description or the diagrams as above may be arbitrary changed unless otherwise mentioned. For example, the information stored in the topology DB 108 may differ in accordance with the type of the IF card or various restrictions in each communication apparatus.

In addition, the constituent elements of the communication apparatus 100 illustrated in the diagrams are in a functional or conceptual sense and are not necessarily configured as illustrated in the diagrams in a physical manner. In other words, a specific form of the separation or integration of each apparatus is not limited to that illustrated in the diagrams, and the whole or a part of the apparatus may be functionally or physically separated or integrated in arbitrary units in accordance with various loads, the use status, or the like. For example, although the non-volatile memory 111 has been described as an example of the non-volatile memory illustrated in FIG. 1 or 2, it may be an example of the RAM illustrated in FIG. 1 or 2. In addition, the numbers or the configurations of the switch 101 and the IF 102 to the IF 104 are not limited to those illustrated in the drawings.

According to an aspect of a communication apparatus and a method of determining a route, which are disclosed here, there is an advantage of accurately selecting a route relating to data transmission even in a case where there is a connection restriction on a node included in a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
a memory that stores topology information shared by nodes included in a network and representing connection states between the nodes and that stores fixed port information relating to a port, for which connectable port within the node is fixedly determined, the topology information including port identification information used for identifying ports that are connectable to each other within each node; and
a processor that determines a route by sequentially selecting a port that can be connected to a port, to which transmission data is input, within each node, based on the port identification information and the fixed port information stored in the memory.

2. The communication apparatus according to claim 1, wherein the processor acquires the port identification information or the fixed port information that is assigned to each node in accordance with a type of interface card, and sets the port identification information or the fixed port information in the memory.

3. The communication apparatus according to claim 2, wherein, when a configuration of the ports is updated within any of the nodes, the processor sets the topology information in accordance with the update.

4. The communication apparatus according to claim 1, wherein, when a plurality of connectable ports are present, the processor determines the route, based on cost values that represent data transmission states in routes, to a node as a linking destination.

5. A non-transitory computer-readable recording medium that stores therein a computer program for determining a route, the computer program causing a computer to execute:
acquiring topology information shared by nodes included in a network and representing connection states between the nodes, the topology information including port identification information for identifying ports that are connectable each other within each node;
acquiring fixed port information relating to a port, for which connectable port within the node is fixedly determined; and
determining a route by sequentially selecting the port that can be connected to a port, to which transmission data is input, within each node, based on the port identification information and the fixed port information.

* * * * *